Nov. 3, 1953 C. SAVAGE 2,657,765
ELEVATOR CONTROL SYSTEM
Filed July 27, 1951 8 Sheets-Sheet 1

WITNESSES:
E. A. McCloskey
N. W. L. Groome

INVENTOR
Conwell Savage.
BY C. L. Freedman
ATTORNEY

Nov. 3, 1953 — C. SAVAGE — 2,657,765
ELEVATOR CONTROL SYSTEM
Filed July 27, 1951 — 8 Sheets-Sheet 2

WITNESSES:

INVENTOR
Conwell Savage.
BY
ATTORNEY

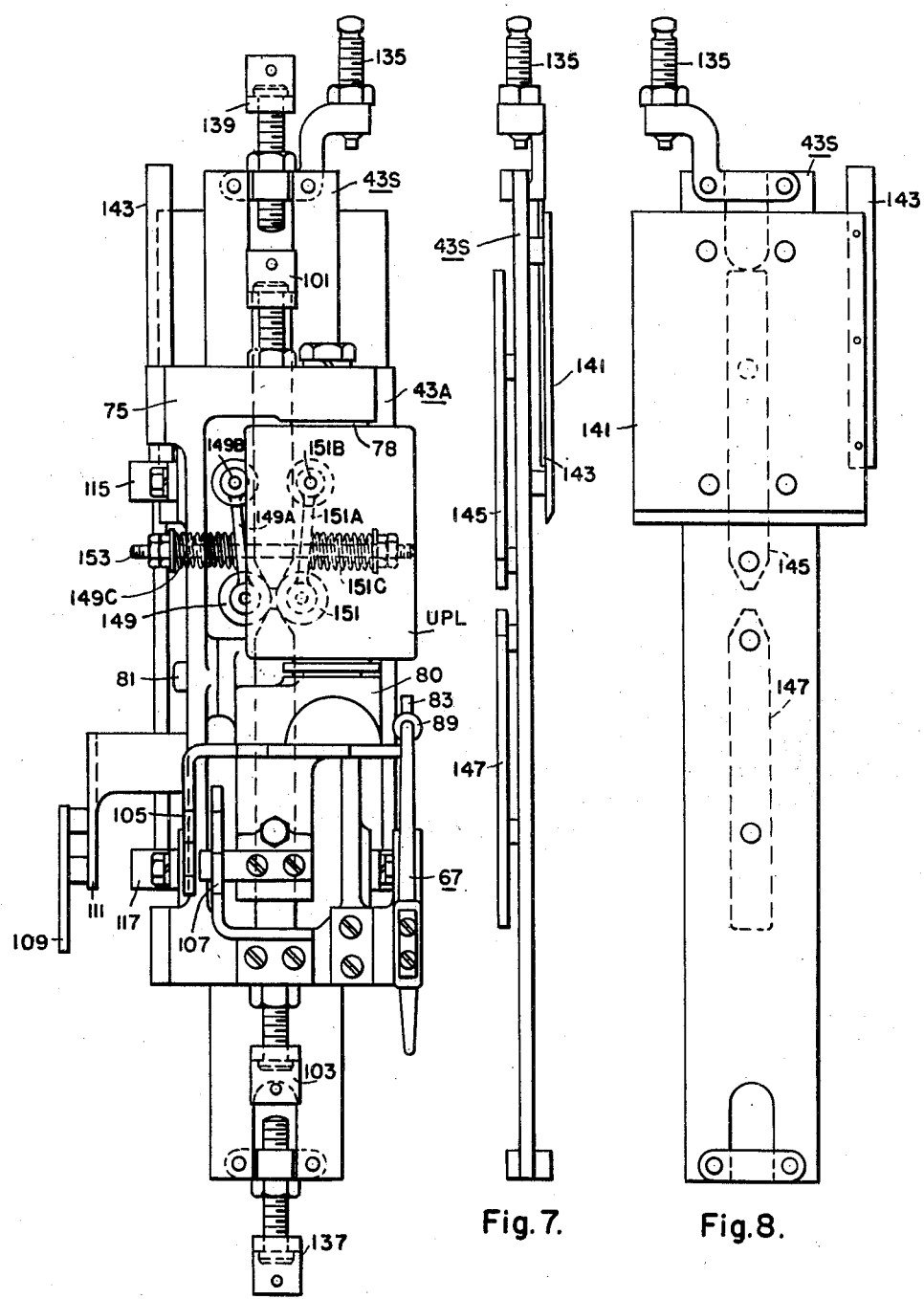

Nov. 3, 1953  C. SAVAGE  2,657,765
ELEVATOR CONTROL SYSTEM
Filed July 27, 1951  8 Sheets-Sheet 6

WITNESSES:
E. A. McCloskey
Nw. C. Groome

INVENTOR
Conwell Savage.
BY C. L. Friedman
ATTORNEY

Nov. 3, 1953    C. SAVAGE    2,657,765
ELEVATOR CONTROL SYSTEM
Filed July 27, 1951    8 Sheets-Sheet 7
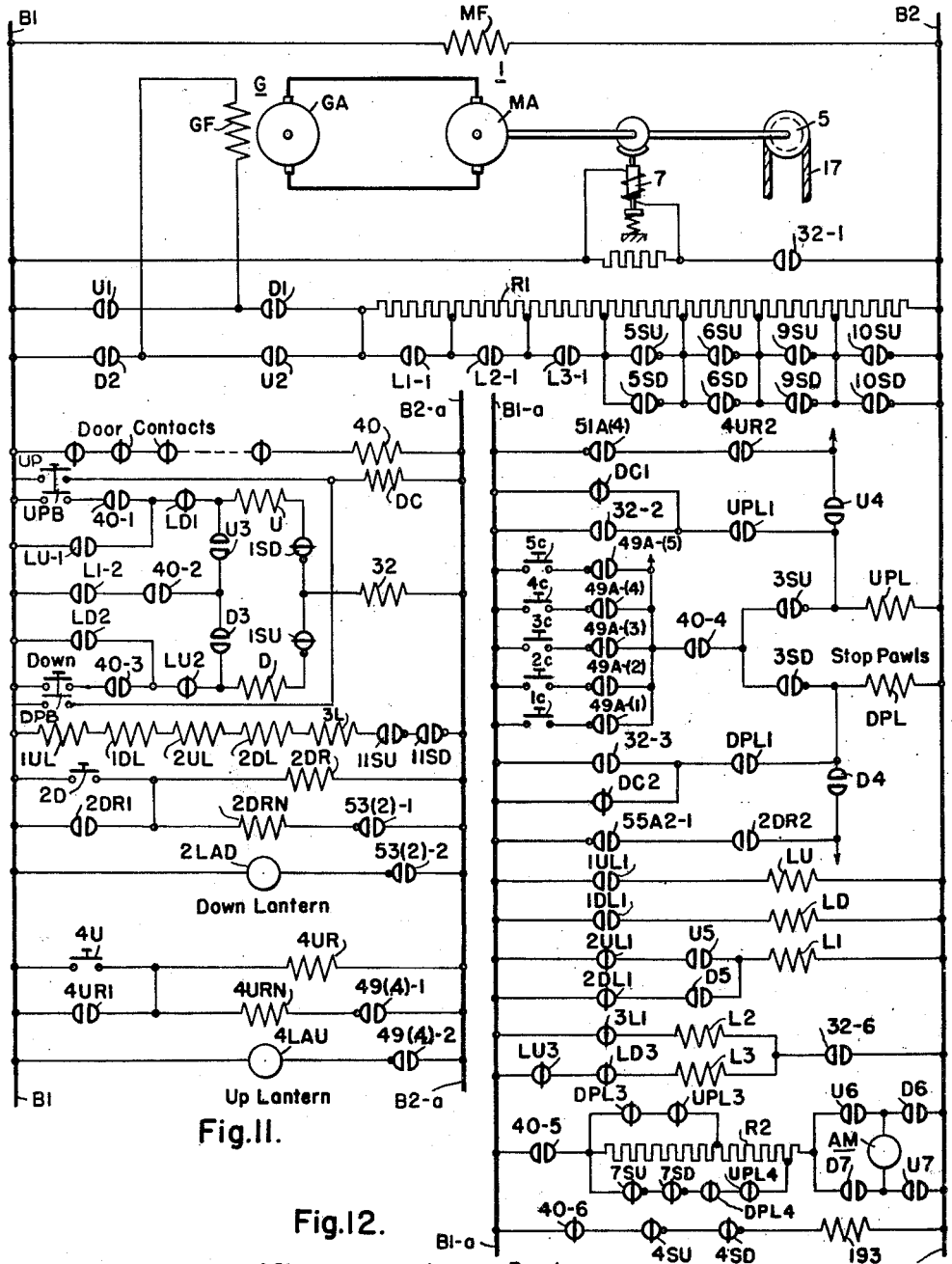
Fig.11.
Fig.12.
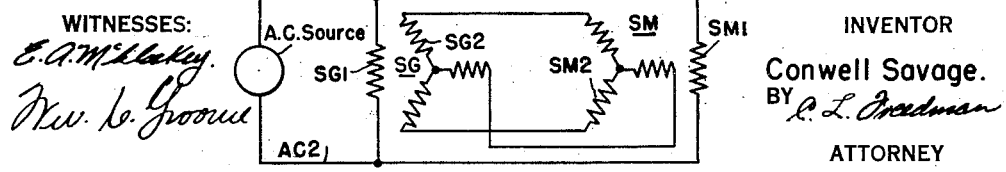
WITNESSES:
INVENTOR
Conwell Savage.
BY
ATTORNEY INVENTOR
Conwell Savage.

Patented Nov. 3, 1953

2,657,765

UNITED STATES PATENT OFFICE 2,657,765

ELEVATOR CONTROL SYSTEM

Conwell Savage, New York, N. Y., assignor to Westinghouse Electric Corporation, East Pittsburgh, Pa., a corporation of Pennsylvania Application July 27, 1951, Serial No. 238,875

53 Claims. (Cl. 187—29)

This invention relates to elevator systems, and it has particular relation to mechanisms and systems for controlling the starting and stopping of elevator cars.

Although the invention may be employed in whole or in part with various types of elevator systems, it is particularly suitable for elevator systems wherein an elevator car stops automatically in response to calls for service. The calls for service may be registered by means of car-call buttons positioned within the elevator car or by means of floor buttons operated by waiting passengers at the various floors served by the elevator car. The elevator system may be of the automatic type wherein an elevator car starts automatically in response to registration of a call for service. However, the invention also is suitable for an attendant-operated elevator system wherein an attendant in the elevator car must perform some function in order to permit the elevator car to start for the purpose of answering a call for service.

The invention is particularly directed to a floor selector for an elevator system. Although the floor selector may initiate the entire slowdown and stopping sequences for an elevator car, preferably the floor selector is employed for controlling the preliminary or initial slowdown points for an elevator car. In the preferred embodiment of a system employing the floor selector, certain slowdown points adjacent each of the floors, the stopping point for each of the floors, and leveling operations, are controlled by highly-accurate equipment located on the elevator car and in the hoistway within which the elevator car operates. As a specific example, the equipment may comprise inductor relays mounted on the elevator car and inductor plates positioned in the hoistway for cooperation with the inductor relays.

In a typical elevator system embodying the invention, the inductor relays and the inductor plates may be arranged to initiate slowdown steps of the elevator car which is to stop at a predetermined floor at distances which may be of the order successively of 20 inches, 10½ inches and 2½ inches from the floor. The inductor relay equipment also may initiate a stopping operation of the elevator car when the elevator car reaches a position of the order of ⅝ inch from the desired floor. The same inductor relays may be employed for the purpose of initiating leveling operations, if leveling of the elevator car is thereafter required.

With inductor relays arranged as indicated in the preceding paragraph, all of the inductor relays required for a car may be mounted on a single bracket secured to the elevator car. A single inductor plate for each of the floors served by the elevator car suffices for all of the inductor relays.

In the preceding example, all additional slowdown points required are controlled from the floor selector. It should be noted that even if the elevator car requires more than the distance between successive floors to slow down from its full running speed, the inductor relays are effective for both one-floor and multiple-floor runs of the elevator car. However, certain of the slowdown points controlled from the floor selector may not be required for an operation of the elevator car between successive floors. With this division of control between the hoistway and the floor selector, highly accurate control points are available in the hoistway for each stop.

The floor selector construction conforming to the invention permits the utilization of compact and reliable pile-up switches. Such switches have contacts which are biased towards or away from each other by means of suitable spring means, such as a plurality of spaced parallel leaf springs. Suitable operators, such as cams, are employed for operating the pile-up switches. In accordance with the invention, the cams and pile-up switches are moved relative to each other rectilinearly.

The invention further contemplates the provision of a pair of sliding carriage units which are mounted on a support for movement in opposite directions. Preferably the carriage units are guided by means of parallel guide elements or rails. This permits the utilization of a balanced construction.

Conveniently, one of the carriage units, termed an up carriage unit, may be employed primarily for control operations required during up travel of the elevator car. The remaining or down carriage unit may be employed primarily for control operations required for down travel of the elevator car.

Floor stop points are determined by simple and effective clamps which preferably are secured to the same rails employed for guiding the carriage units. The same clamps preferably are employed for supporting switches associated with each of the floors served by the elevator car. Inasmuch as the clamps are secured to the same rails employed for guiding the carriage units, correct alignment between the carriage units and the equipment secured to the clamps is assured.

Each of the carriage units comprises a synchronous carriage which is moved in accordance with movement of the elevator car and an advance or lead carriage which is connected to the synchronous carriages through a lost-motion connection. Preferably, the two synchronous carriages are connected in a flexible loop. Similarly, the advance carriages preferably are associated in a flexible loop. Drive units for the two flexible loops then may be associated with a common supporting structure.

After each stop of the elevator car, the synchronous carriages preferably are reset or accurately positioned with respect to the advance carriages. The positions of the advance carriages at each stop are determined by an accurately positioned floor-stop clamp. In addition, the position of the elevator car for the same stop is determined accurately by the inductor-relay equipment located on the elevator car and in the hoistway. By adjusting the synchronous carriages relative to the advance carriages at this time, the synchronous carriages are accurately positioned relative to the elevator car. Although such resetting may be omitted, it is preferably included to care for possible dislocations of the synchronous carriages due to dust or debris collecting on the tapes, cables or other equipment employed for driving the synchronous carriages, the slipping of such equipment or for dislocations resulting from expansions or contractions of parts of the drive assembly.

In a preferred embodiment of the invention, the synchronous carriages carry no switches. The synchronous carriages in effect constitute cams for operating switches mounted on the advance carriages.

It is therefore an object of the invention to provide an improved floor selector wherein substantially all switches are of the pile-up type.

It is a second object of the invention to provide a floor selector, as defined in the preceding paragraph, wherein the switches are operable by cams which are movable rectilinearly relative to the pile-up switches.

It is a third object of the invention to provide an improved floor selector for elevator systems wherein sliding carriage units are mounted on a supporting structure for movement in opposite directions.

It is a fourth object of the invention to provide a floor selector for an elevator system, as defined in the preceding paragraph wherein one of the carriage units is employed primarily for control functions during up travel of the elevator car, and the remaining or down carriage unit is employed primarily for control operations during down travel of the elevator car.

It is a fifth object of the invention to provide a floor selector wherein carriage units are mounted for movement along guide elements and wherein floor-stop points are determined by clamps secured to the guide elements.

It is a sixth object of the invention to provide a floor selector as defined in the preceding paragraph wherein switches are secured to the clamps for operation by the carriage units.

It is a seventh object of the invention to provide a floor selector wherein carriage units are mounted on a supporting structure for movement in opposite directions and wherein each of the carriage units includes advance and synchronous carriages which are coupled to each other through a lost-motion coupling.

It is an eighth object of the invention to provide a floor selector, as defined in the preceding paragraph, wherein the synchronous carriages are associated in a first continuous flexible loop and the advance carriages are associated in a second continuous flexible loop.

It is a ninth object of the invention to provide a floor selector, as defined in the preceding paragraph, wherein each of the loops is provided with a drive unit mounted on a common support.

It is a tenth object of the invention to provide a floor selector for an elevator car which includes a synchronous carriage and an advance carriage which are coupled through a lost-motion coupling and wherein the synchronous carriage is reset to a definite position relative to the advance carriage following each stop of the advance carriage.

Other objects of the invention will be apparent from the following description taken in conjunction with the accompanying drawings, in which:

Fig. 6 is a view in front elevation of the carriage unit illustrated in Fig. 5;

Fig. 7 is a view in side elevation of a synchronous carriage suitable for the floor selector of Fig. 2;

Fig. 8 is a view in rear elevation of the synchronous carriage illustrated in Fig. 7;

Fig. 11 is a schematic view with circuits shown in straight line form, showing control circuits suitable for the elevator system of Fig. 1;

Figs. 11 and 11A are placed in horizontal alignment, the corresponding coils and contacts of the two figures will be found to be in horizontal alignment.

Fig. 12 is a schematic view showing circuit connections for a self-synchronous system employed in the elevator system of Fig. 1.

General system

Figure 1:
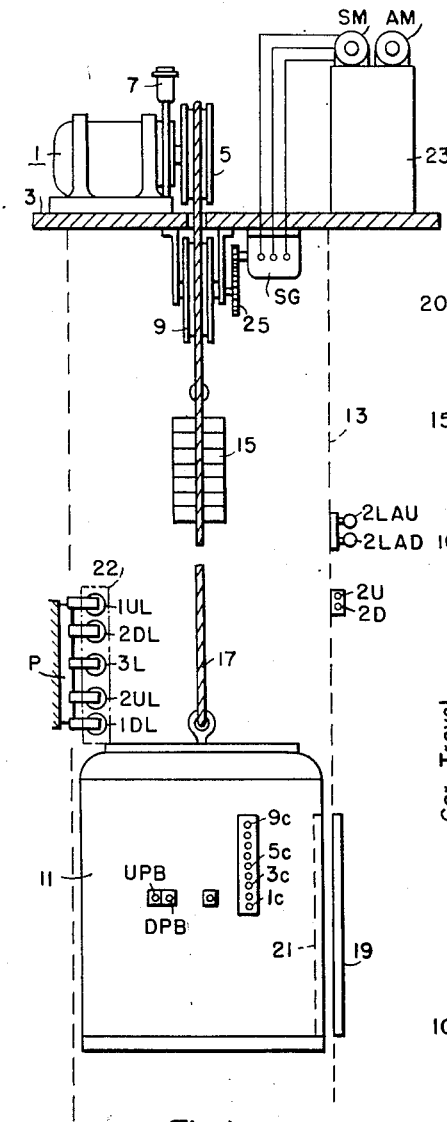
Figure 1 is a schematic view with parts shown in elevation and parts in cross-section of an elevator system embodying the invention.

Although the invention may be employed in elevator systems for various types of operation, it will be assumed that the system of Fig. 1 is designed for what is known as "signal operation." Referring to Fig. 1, an elevator motor I is secured to the upper surface of a floor 3 which may be located in the penthouse of a building being served by the elevator system. The elevator motor 1 has a traction sheave 5 secured to its shaft, and an elevator brake 7 is associated with the elevator motor and the traction sheave in a conventional manner. As will be pointed out below, the elevator brake is spring applied to hold the traction sheave 5 stationary and is released in response to energization of a solenoid. A secondary or idler sheave 9 is secured to the lower surface of the penthouse floor 3.

An elevator car 11 is mounted for movement in a hoistway 13 to serve the various floors of the building associated therewith. The elevator car is connected to a counterweight 15 by means of one or more ropes or cables 17 which pass around the traction sheave 5 and the secondary sheave 9 in a conventional manner.

At each floor served by the elevator car, a hoistway or floor door 19 is provided. In addition, the elevator car has a gate 21 which registers with the hoistway door at any floor at which the elevator car is stopped. The doors and the gate may be of conventional construction and may be operated automatically in any conventional way. However, for present purposes, it will be assumed that the gate and doors are opened and closed by an elevator car attendant.

In order to register calls for floors desired by passengers traveling in the elevator car, a plurality of car call buttons 1c to 9c are provided. It is assumed that the building served by the elevator car has nine floors requiring service. The elevator car also contains an up push button UPB and a down push button DPB which are operated by the car attendant in order to condition the elevator car for up travel or down travel.

As illustrated in Fig. 1, an up push button 2U is provided at the second floor for operation by a person desiring transportation in an up direction. A similar push button would be provided at each of the floors from which a person may desire to travel in an up direction. Hereinafter each such push button will be identified by the reference character U preceded by a number corresponding to the floor at which the button is located. In a similar manner, Fig. 1 shows a down push button 2D which may be operated by a person desiring to travel in a down direction. A similar push button would be located at each floor from which a person may desire transportation in a down direction.

In order to signal the approach and direction of an elevator car to an attending passenger, suitable floor signals such as lanterns may be provided. Thus, in Fig. 1, an up floor lantern 2LAU and a down floor lantern 2LAD are illustrated. Similar lanterns may be provided at each floor requiring such signals.

As the elevator car approaches a floor at which it is to stop, it is desired that the elevator car stop automatically and accurately in registration with the desired floor. To this end, position-responsive mechanism is provided in the hoistway and on the elevator car. Thus, Fig. 1 shows five inductor relays 1UL, 2DL, 3L, 2UL and 1DL mounted on a common bracket 22 which is secured to the elevator car. An inductor plate P constructed of magnetic material is located in the hoistway for each of the floors served by the elevator car. When the elevator car is accurately stopped at a floor, the inductor relays are associated with the plate P for such floor in the manner illustrated in Fig. 1.

To illustrate the operation of the inductor relays, it will be assumed that the elevator car is approaching a desired floor at which it is to stop while traveling in an up direction. When the inductor relay 1UL reaches the inductor plate P, it closes contacts to initiate a slowdown of the elevator car. As a typical example, such initiation may occur when the elevator car is 20 inches from the desired floor. As the elevator car continues to approach the desired floor at reduced speed, the inductor relay 2DL reaches the inductor plate but has no effect on the movement of the elevator car. Upon still further movement, however, the inductor relay 3L reaches the plate P when the car is say 10½ inches from the desired floor. The inductor relay 3L then closes contacts to initiate a further slowdown of the elevator car.

As the elevator car continues to approach the desired floor, the inductor relay 2UL reaches the inductor plate P when the car is say 2½ inches from the desired floor. The inductor relay 2UL initiates slowdown of the elevator car to its landing speed. The inductor relay 1UL leaves the inductor plate P and reopens its contacts when the car is say ⅝ inch from the desired floor. The separation of the contacts of the inductor relay 1UL initiates application of the elevator brake and deenergization of the elevator motor to stop the car accurately at the desired floor.

In a similar way, the inductor relays 1DL, 3L, 2DL and 1DL cooperate successively to slow down and stop the elevator car during down travel at a desired floor.

When the elevator car is located accurately at a desired floor, the inductor relays 1UL and 1DL are just clear of the inductor plate P. If for any reason the elevator car is stopped slightly below or slightly above the desired floor, the appropriate inductor relay 1UL or 1DL picks up to initiate movement of the elevator car into accurate registration with the desired floor.

Inductor relays are well known in the art. The association of inductor relays illustrated in Fig. 1 also is shown in a copending patent application, Serial No. 167,201, filed June 9, 1950 by Danilo Santini et al., and assigned to the assignee of the present application.

Further control of the operation of the elevator car is provided by a floor selector 23 which conveniently may be mounted on the penthouse floor 3. This floor selector has two drive inputs supplied thereto. One is a drive input by an advance motor AM located on the top of the floor selector. A second drive input is supplied for the purpose of driving the floor selector in accordance with movement of the elevator car. Such a drive input may be provided in any desired manner. For example, a drive tape may be provided in a known manner for mechanically driving the selector unit in accordance with movement of the elevator car. However, in Fig. 1, a preferred drive is provided of the self-synchronous type. Such a drive includes a transmitter or generator SG which is electrically connected to a receiver or motor SM. The transmitter or generator SG is coupled to the secondary sheave 9 through suitable gearing 25. A self-synchronous drive of this type is shown in the Bouton Patent 2,482,458, which was issued September 20, 1949.

*Floor selector*

Figure 2:
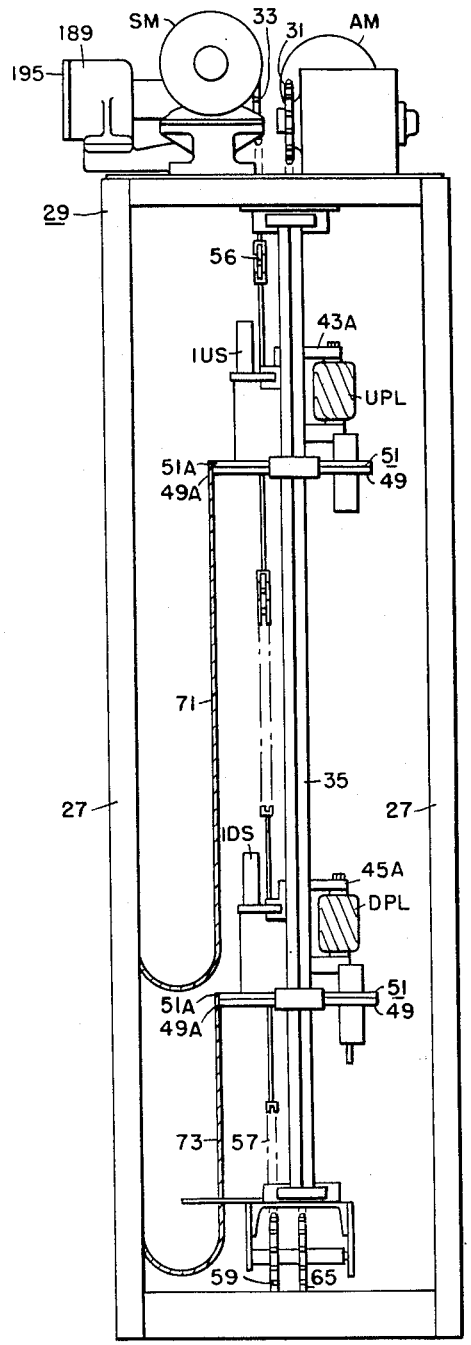
Fig. 2 is a view in side elevation of a floor selector suitable for the system of Fig. 1.

The floor selector is illustrated in greater detail in Figs. 2 through 10, inclusive. Referring first to Fig. 2, it will be noted that a plurality of angles 27 and other structural parts are associated in any suitable manner to provide a rigid framework or supporting structure 29.

As previously pointed out, two drive inputs are supplied to the floor selector. One of the drive inputs is supplied by the advance motor AM which is mounted on top of the floor selector supporting structure 29 and which drives a sprocket wheel 31 through a slip coupling which will be described below. The motor SM also is mounted on top of the supporting structure 29 and drives a sprocket 33 through a releasable coupling which will be described below. It will be noted that the sprocket wheels 31 and 33 are parallel to each other and are mounted for rotation about parallel axes.

The supporting structure 29 also supports three spaced parallel guide elements or rails 35, 37 and 39. These guide rails preferably have non-circular cross-sections. Desirably, the cross-sections of these guide rails may be of polygonal shape, and in the preferred embodiment of the invention, these guide rails have a square cross-section. It will be noted that a diagonal of the cross-section of each of the rails is located in a common plane.

The guide rails are employed in part for guiding two carriage units 43 and 45. The carriage unit 43 is guided by adjacent edges of the guide rails 35 and 37, whereas the carriage unit 45 is guided by adjacent edges of the guide rails 37 and 39.

Certain control operations are performed by the carriage units as the elevator car moves in its hoistway. When the elevator car is to be brought to a stop at a desired floor, the carriage units also are brought to a stop at predetermined points corresponding to the desired floor. In order to perform the desired operations, a plurality of floor-stop units are provided. Certain of the floor-stop units are secured to the rail 35 and are employed primarily during up travel of the elevator car. These floor units will be designated by the reference character FSU preceded by the number of the floor corresponding to the stop unit. Thus, the reference character 9FSU designates the stop unit for the ninth floor associated with the rail 35. Although stop units are shown only for the first and ninth floors in Fig. 3, it will be understood that similar stop units will be provided between the illustrated stop units for the intermediate floors. The stop units associated with the rail 39 are employed primarily for down travel of the elevator car and will be designated by the reference character FSD preceded by the number of the floor corresponding to the stop unit. It is to be understood, however, that certain parts of the carriage units 43 and 45 move in unison, and the floor-stop units associated with rails 35 and 39 may be employed for certain functions during travel of the elevator car in either direction.

Each of the floor-stop units associated with the rail 35 includes a first set of pile-up switches 49, a second set of pile-up switches 51, a third set of pile-up switches 49A, a fourth set of pile-up switches 51A and clamping means for securing the switches to the associated guide rail. In addition, each of the floor-stop units includes a lug which under certain conditions may be employed for stopping the associated carriage unit 43 when a stop is to be made at the associated floor by the elevator car. The construction of the floor-stop unit will be discussed in greater detail below. In a similar manner, each of the floor-stop units associated with the guide rail 39 includes a set of pile-up switches 53, a set of pile-up switches 55, a set of pile-up switches 53A, a set of pile-up switches 55A and a lug which is utilized for stopping the associated carriage unit 45 when the elevator car is to stop at the associated floor.

The carriage unit 43 is divided into two main parts comprising a synchronous carriage 43S and an advance or lead carriage 43A. In an analogous manner, the carriage unit 45 includes a synchronous carriage 45S and an advance carriage 45A.

The synchronous carriages 43S and 45S are moved in opposite directions in accordance with movement of the associated elevator car. In the preferred embodiment of the invention illustrated in the drawings, the synchronous carriages 43S and 45S are connected in a flexible loop by means of flexible members, such as chains 56 and 57. The chain 56 has its ends connected respectively to the upper ends of the synchronous carriages and passes around the sprocket wheel 33. The chain 57 has its ends connected to the lower ends of the synchronous carriages and passes around an idler sprocket wheel 59. By inspection of Figs. 2 and 3, it will be observed that the synchronous carriages are driven in opposite directions by the motor SM in accordance with movement of the associated elevator car.

The advance carriages 43A and 45A similarly are associated for movement in opposite directions by means of chains 61 and 63. The chain 61 has its ends connected to the upper ends of the advance carriages and passes around the sprocket wheel 31 which is driven by the advance motor AM. The chain 63 has its ends connected to the lower ends of the advance carriages and passes around an idler sprocket wheel 65. The advance carriages are connected to the synchronous carriages by means of a lost-motion coupling. Consequently, they move in unison with the synchronous carriages except for such relative movement as is permitted by the lost-motion coupling. The advance motor under certain conditions may move the advance carriages relative to the synchronous carriages by the distance permitted by the lost-motion coupling.

The advance carriage 43A carries an up pawl relay UPL which operates a set of pile-up switches 67. As hereinafter pointed out, energization of the coil of the relay also projects a stopping pawl into a position to engage the lug of one of the floor-stop units during up travel of the elevator car, and such energization also projects a cam into position for operating certain of the switches carried by one of the floor-stop units. In addition, the advance carriage 43A carries pile-up switches (one of which 1US is illustrated in Fig. 2) which are operated in response to relative movement of the advance and synchronous carriages 43A and 43S. The construction of these various parts will be discussed in greater detail below.

In an analogous manner, the advance carriage 45A carries a down pawl relay DPL which operates a set of pile-up switches 69. Energization of the coil of this relay also projects a pawl into position to engage one of the associated floor-stop units and projects a cam into position to engage certain of the pile-up switches carried by one of the floor-stop units. In addition, the advance carriage 45A carries switches (one of which 1DS is illustrated in Fig. 2) which are operated in response to relative movement of the advance and synchronous carriages 45A and 45S.

Inasmuch as connections must be made between switches mounted on the advance carriages and external circuits, a pair of flexible cables 71 and 73 are provided. The conductors in the cables 71 each has an end connected to an appropriate switch mounted on the advance carriage 43A. Certain of the conductors also are connected to the coil of the relay UPL. The remaining ends of the conductors are connected to external circuits, as desired. Sufficient play is provided to permit the flexible cable 71 to follow or trail the advance carriage 43A without interfering with the motion thereof. The cable 73 similarly is associated with the advance carriage 45A.

It may be pointed out that the carriage unit 43 is effective for stopping the elevator car only while the carriage unit is traveling in an up direction. The parts are so arranged that the carriage unit 45 also is effective for a stopping operation only while traveling in the up direction. For this reason the floor-stop units 9FSU and 9FSD are located at opposite ends of the floor selector.

Figure 4:
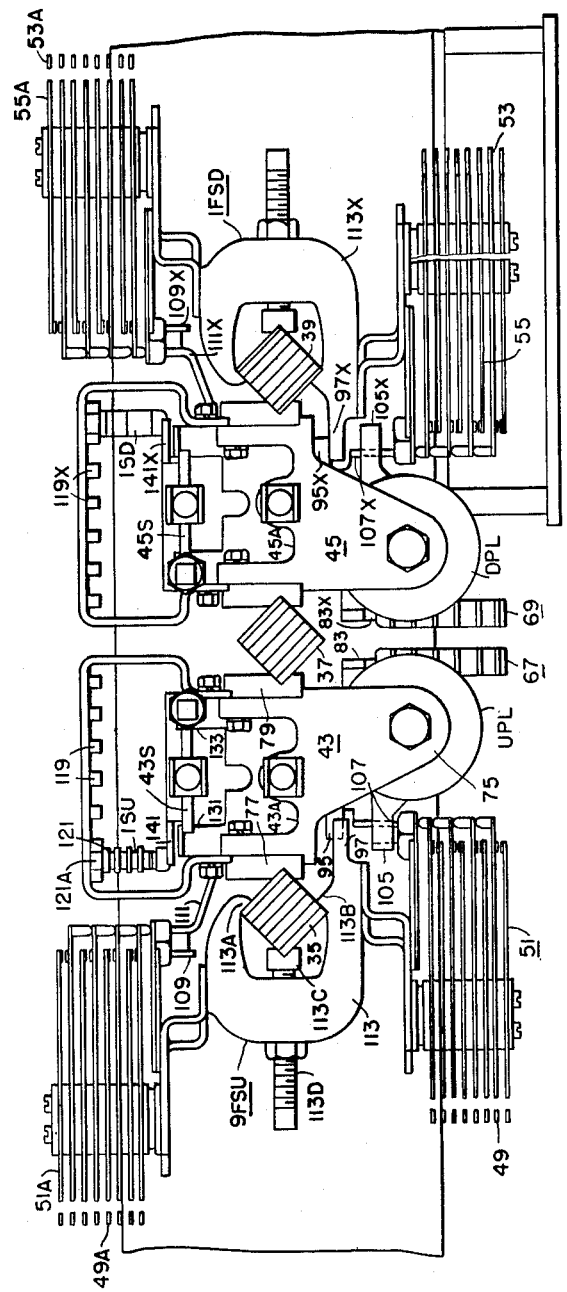
Fig. 4 is a view taken along the line IV—IV of Fig. 3.

Referring more particularly to Fig. 4, it will be noted that the advance carriage 43 includes a body 75 which may be constructed of a soft magnetic material, such as soft iron or steel. This body has secured to it two guide shoes 77 and 79 which have V notches for receiving respectively the adjacent corners of the rails 35 and 37. The guide shoes guide the advance carriage 43 accurately along the guide rails.

Figure 5:
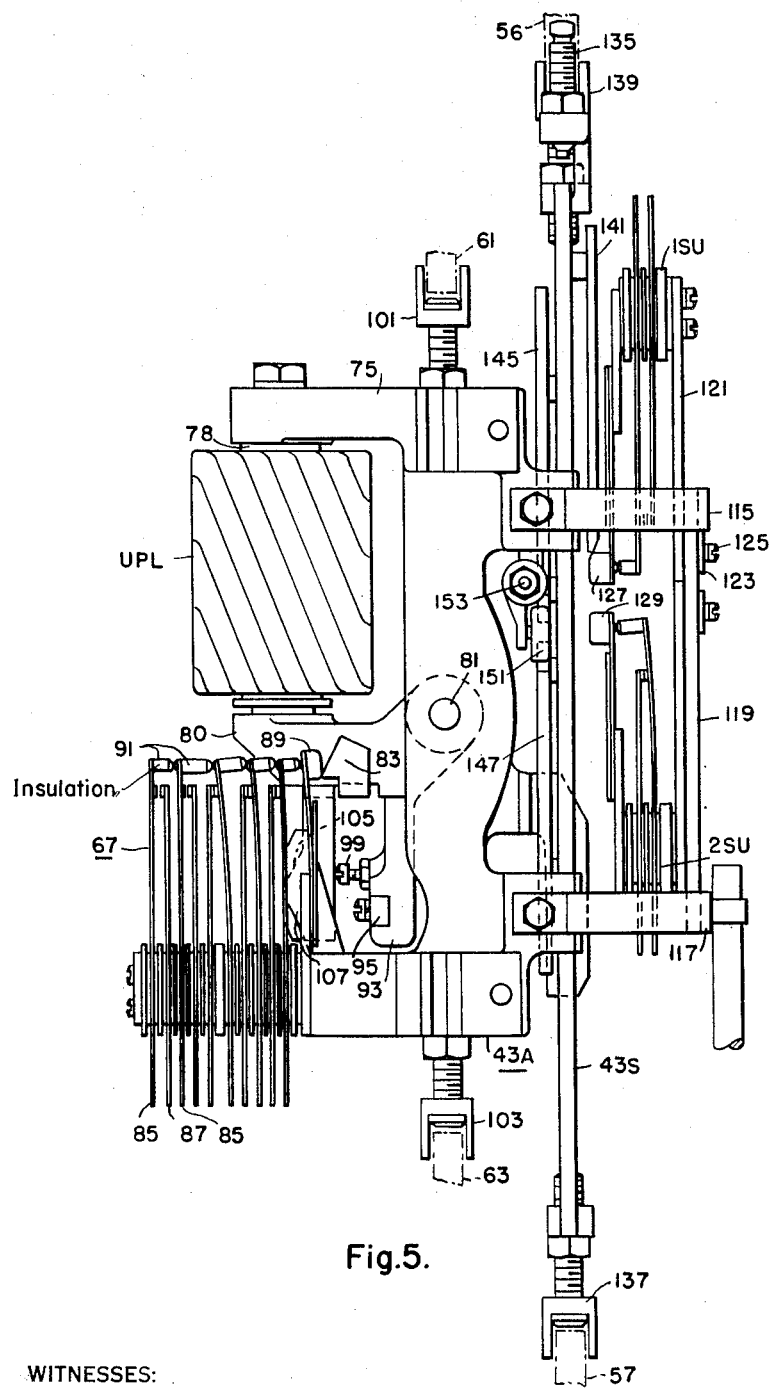
Fig. 5 is a view in side elevation of a carriage unit suitable for a floor selector of Fig. 2.

As shown more clearly in Fig. 5, the up pawl relay has a soft magnetic core 78 secured to the body 75, and the coil of the relay surrounds the magnetic core. The relay includes a soft magnetic armature 80 which is illustrated in Fig. 5 in its picked up condition. The armature is mounted on the body 75 for rotation about a pin 81. It will be noted that the armature 80 carries a cam 83 which is positioned to operate the set of pile-up switches 67. The pile-up switches are of conventional construction and include a plurality of parallel electro-conductive leaf springs 85 and 87 which carry contacts insulated from each other and biased into a predetermined condition. In the specific embodiment of Fig. 5, the set of pile-up switches includes two sets of break contacts which are open when the relay is in its energized or picked-up condition. Also, the set includes three sets of contacts of the make type which engage each other when the relay is in the energized or picked-up condition shown in Fig. 5. However, any other arrangement of contacts may be employed, if so desired. It will be noted that the set of pile-up switches includes a cam follower 89 which is positioned for engagement by the cam 83. The cam follower is biased toward the right, as viewed in Fig. 5. Consequently, when the relay is deenergized, the cam follower 89 moves to the right in order to permit return of the sets of contacts to the positions they occupy when the relay is deenergized. Insulating spacers 91 are placed between the upper end of the springs 85 in order to transmit motion from cam follower 89 to the various springs.

The armature 80 also has an arm 93 which carries a stop pawl 95. When the relay UPL is in its energized or picked-up condition, the stop pawl 95 is positioned to engage a stop lug on the next one of the floor stop units reached by the pawl. In Fig. 4, the stop pawl 95 is positioned in engagement with the lug 97 secured to the clamp of the floor-stop unit 9FSU. An adjustment screw 99 is in threaded engagement with the arm 93 (Fig. 5) and engages a portion of the body 75 to determine the position of the armature 80 when the relay UPL is deenergized.

It will be noted that the advance carriage has at its upper and lower ends, adjustable sockets 101 and 103 which are in threaded engagement with the body 75. These sockets receive the ends of the chains 61 and 63 which are secured thereby to the advance carriage.

The armature 80 of the up pawl relay UPL also has a cam 105 secured thereto. When the up pawl relay is in its energized or picked-up condition, the cam 105 is positioned to engage certain switches mounted on one of the floor-stop units. When the relay is in its deenergized condition, the cam 105 clears all of these switches.

An additional cam 107 is secured to the advance carriage. This cam also is positioned to engage certain of the switches mounted on the floor-stop units during the travel of the elevator car. Since this cam is fixed to the advance carriage, it is always in position to engage certain of the switches at predetermined points in the travel of the elevator car.

By reference to Fig. 4, it will be noted that the movable cam 105 is positioned to operate the set of pile-up contacts 49 at predetermined points in the travel of the elevator car, provided the up pawl relay UPL is energized. The fixed cam 107 engages the sets of pile-up contacts 51 at predetermined points during each movement of the elevator car.

Two additional fixed cams 109 and 111 (Fig. 4) are secured to the body 75 of the advance carriage 43. These cams are positioned to cooperate respectively with the sets of pile-up contacts 49A and 51A during the travel of the elevator car.

The construction of the sets of pile-up contacts 49, 51, 49A and 51A in Fig. 4 will be understood from the description of the set 67 in Fig. 5. It will be understood that in each set make and break contacts may be provided, as required. It will also be understood that the point of operation and the duration of operation of each of the sets of pile-up contacts may be determined by the position and length of the associated cam.

Figure 3:
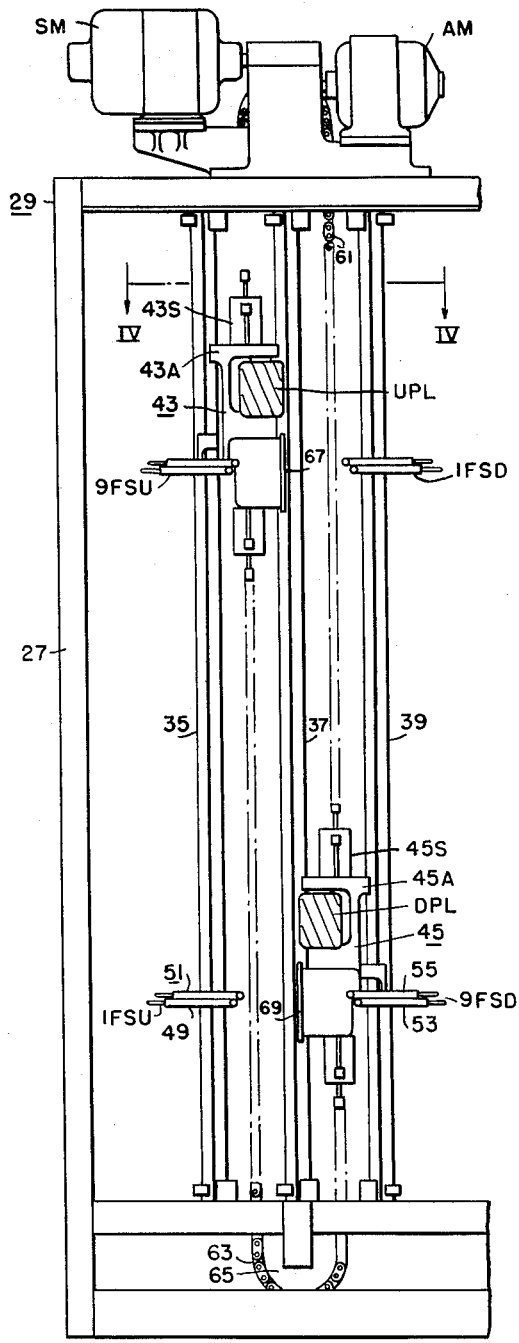
Fig. 3 is a view in front elevation with parts broken away of the floor selector illustrated in Fig. 2.

By reference to Fig. 4 it will be observed that the sets of pile-up contacts 49, 51, 49A and 51A for each of the floor-stop units are secured to the clamp 113 for the same floor. As shown in Figs. 2 and 3 certain of the sets such as sets 49 and 49A may be positioned slightly below the other sets 51 and 51A, and may be slightly staggered.

The clamp 113 (Fig. 4) is of C construction and has two lips 113A and 113B for engaging the upper and lower corners of the rail 35, as viewed in Fig. 4. It will be noted that these corners lie along one diagonal of the cross-section of the rail. The spacing of the lips 113A and 113B may be sufficient to just clear one side of the rail. The clamp then may be moved over the rail and rotated 45° into the position illustrated in Fig. 4.

For adjustably securing the clamp 113 to the associated rail, the clamp additionally includes a block 113C. This block has a V notch for receiving one corner of the associated guide rail and is forced against the guide rail by means of a screw 113D which is in threaded engagement with the body of the clamp 113. Consequently, the clamp may be adjusted along the guide rail 35, and the screw 113D thereafter may be operated to secure the clamp in any desired position of adjustment. Since the same guide rail is employed for guiding the advance carriage 43, it is clear that proper alignment between the various parts is assured.

By inspection of Fig. 5, it will be noted that two spaced brackets 115 and 117 are secured to the body 75. A plurality of parallel spaced bars 119 are secured to these brackets. In the specific embodiment of Fig. 4, seven parallel spaced bars 119 are illustrated.

The bars are employed for adjustably positioning a plurality of switches of the pile-up type. As shown in Fig. 5, a switch 1SU is secured to a strap 121. The strap 121 bridges two adjacent parallel bars 119 and has a portion 121A (Fig. 4) extending between the bars to guide the switch for vertical movement. A washer 123 large enough to bridge two adjacent bars has a screw 125 passing therethrough into threaded engagement with the strap 121. Consequently, the strap may be adjusted in a vertical path to the proper position, and the screw 125 then may be operated to clamp the switch securely to the advance carriage. A switch 2SU is shown similarly secured to the bars 119. Both of these switches may be of the general type previously described and are operated respectively through cam followers 127 and 129. The switch 1SU is illustrated as of the make type, whereas the switch 2SU is illustrated as of the break type. However, it will be appreciated that any desired number and arrangement of contacts may be employed. Although only two switches are illustrated in Fig. 5, it will be understood that additional switches may be secured between appropriate bars 119, as desired.

Referring again to Fig. 4, it will be observed that the body 75 of the up pawl relay UPL has two slots 131 and 133 for receiving and guiding the synchronous carriage 43S. Consequently, the advance carriage guides the synchronous carriage for movement in a direction parallel to the rails 35 and 37. The amount of movement in one direction is determined by an adjustment screw 135 (Figs. 5 and 6) which is positioned to engage the body 75 when the advance carriage reaches one limit in its travel relative to the associated synchronous carriage. The screw 135 is in threaded engagement with the synchronous carriage and may be adjusted for the purpose of adjusting the magnitude of the lost-motion coupling between the two carriages.

The synchronous carriage also has adjustable sockets 137 and 139 for reception respectively of the ends of the chains 56 and 57 (Fig. 5), which are secured thereto. The sockets include adjustable screws which are in threaded engagement with the synchronous carriage 43S and may be adjusted, as required.

As clearly shown in Figs. 5, 7 and 8, the synchronous carriage has secured thereto a cam 141 which is designed to operate the various switches, such as switches 1SU and 2SU, which are secured to the bars 119. By inspection of Fig. 5, it will be observed that the switches are operated by engagement of the cam with the cam followers 127 and 129 in response to relative movement between the carriages. As previously pointed out, the position at which each switch is operated may be adjusted by adjusting the position of the desired switch relative to the advance carriage.

A scale 143 is secured to the cam 141. The scale may be calibrated relative to the upper edge of the body 75 to indicate the lead or advance of the advance carriage relative to the synchronous carriage.

Provision is made for resetting the synchronous carriage each time a stop is made by the elevator car. It will be recalled that for each stop the advance carriage is accurately positioned by the associated floor-stop unit, and the elevator car is accurately positioned under the control of the associated inductor relays and inductor plate. To facilitate the resetting of the synchronous carriage, the synchronous carriage is provided with a structure providing one or more notches. As shown in Figs. 6, 7 and 8, this structure may take the form of a pair of vertically-aligned plates 145 and 147. Adjacent edges of the plates are of V configuration and define cam notches for receiving a pair of rollers 149 and 151 (Fig. 6). These rollers are mounted for rotation at the ends of arms 149A and 151A, and the arms in turn are pivotally mounted on the advance carriage by means of pins 149B and 151B.

A bolt 153 extends through the arms 149A and 151A. A separate compression spring 149C and 151C is compressed between each arm and the adjacent end of the bolt. These springs bias the rollers 149 and 151 into the notches. Consequently, if the synchronous carriage is free to move relative to the advance carriage and is displaced from the position illustrated in Fig. 6, the rollers will force the synchronous carriage into the correct position. The bias is insufficient to interfere with movement of the advance carriage relative to the synchronous carriage by the advance motor.

It is believed that construction of the carriage unit 45 and the floor-stop unit FSD will be clear from the foregoing description of the carriage unit 43 and a floor-stop unit FSU. The parts to the right of the center line in Fig. 4 are in effect mirror or reflected reproductions of the parts to the left of said center line. The advance carriage 45A is guided relative to the rails 37 and 39 in substantially the same manner by which the advance carriage 43A is guided by the rails 35 and 37. The down pawl relay DPL operates substantially in the same manner as the up pawl relay UPL. When the down pawl relay DPL is energized, it operates the pile-up switches 69 by means of a cam 83X which corresponds to the cam 83 associated with the up pawl relay UPL. In addition, the down pawl relay positions a movable cam 105X to engage certain pile-up switches 53 associated with one of the floor-stop units. Additional cams 107X, 111X, and 109X are secured to the advance carriage 45A to operate pile-up switches 55, 55A, 53A in substantially the same manner by which cams 107, 111 and 109 associated with the advance carriage 43A operate switches. Parts associated with the carriage unit 45 which correspond to related parts associated with the carriage unit 43, are identified by the same reference characters followed by the subscript X. When the down pawl relay DPL is energized, it positions the stop pawl 95X to engage the lug 91X of a floor-stop unit during upward travel of the carriage unit 45. This corresponds to the operation of the stop pawl 95 and the lug 97. It will be understood that the clamp 113X for the floor-stop unit 1FSD is associated with the rail 39, and the sets of pile-up switches 53, 55, 53A and 55A are secured to the clamp 113X in substantially the same manner discussed for the floor-stop unit 9FSU.

Switches, such as a switch 1SD, corresponds to the switches, such as the switch 1SU of the up carriage unit, and are secured to bars 119X in the same manner. These switches are operated by a cam 141X in the same manner by which the switches of the up carriage unit 43 are operated by the corresponding cam 141. The synchronous carriage 45S is guided by the advance carriage 45A in a manner which will be clear from the discussion of the corresponding parts of the carriage unit 43.

Although the positions and lengths of the various cams may be selected in accordance with the requirements of each elevator system, it may be helpful to consider a specific example. Dimensions or displacements will be given in terms of feet of car travel corresponding to the displacement of the advance carriages from the positions they occupy when the elevator car is stopped at a floor. Thus, the cams 111 and 111X may operate the switches 51A and 55A four feet before the floor and release the switches two feet after the floor. The cams 107 and 107X may operate the switches 51 and 55 three feet before the floor and may release the switches one foot after the floor. The cam 109 may operate the switches 49A four feet before the floor and may release the switches four feet after the floor. The cam 109X may operate the switches 53A six feet before the floor and release the switches six feet after the floor. The cams 105 and 105X (when in camming position) may operate the switches 49 and 53 two feet before the floor and release the switches one foot after the floor.

It will be recalled that the advance motor AM of Fig. 2 is coupled to the sprocket wheel 31 through a slip coupling, whereas the motor SM is coupled to the sprocket wheel 33 through a releasable coupling. Although various constructions may be employed for such couplings, specific embodiments are illustrated in Fig. 10.

Figure 10:
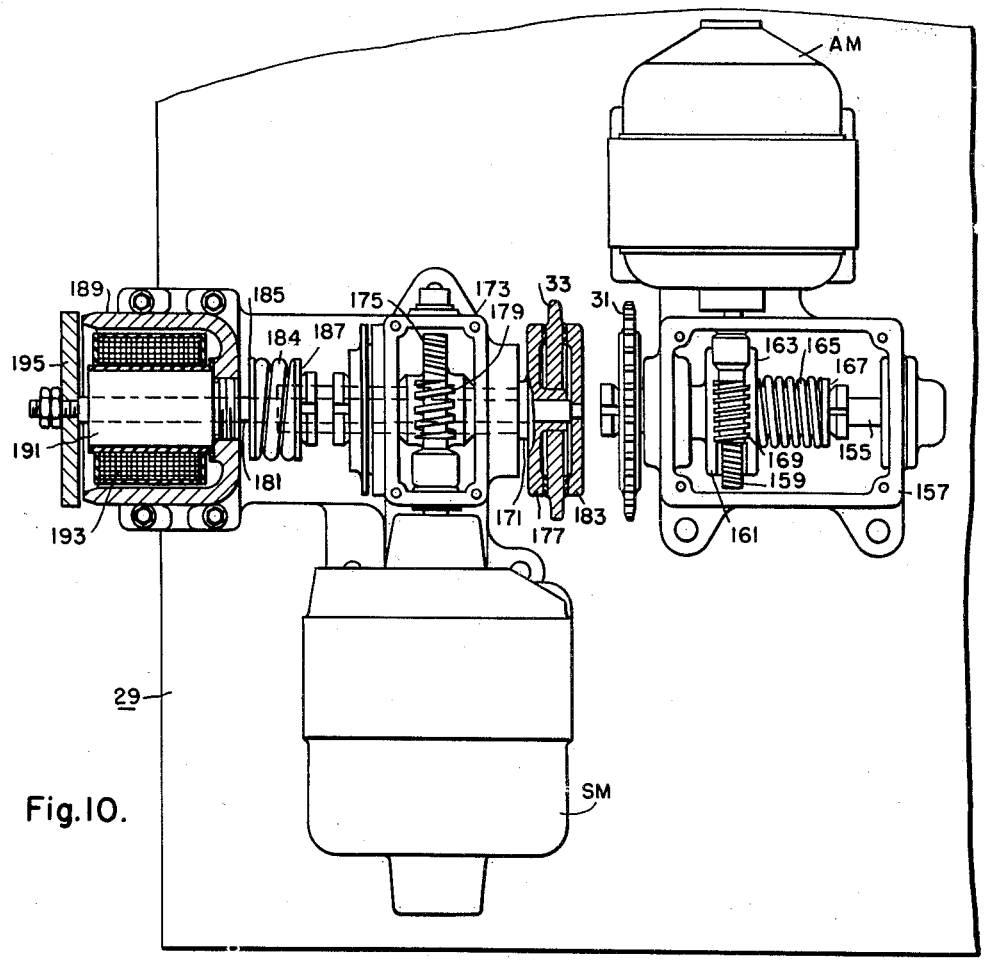
Fig. 10 is a view in top plan with parts broken away of the floor selector illustrated in Fig. 2.
Figure 9:
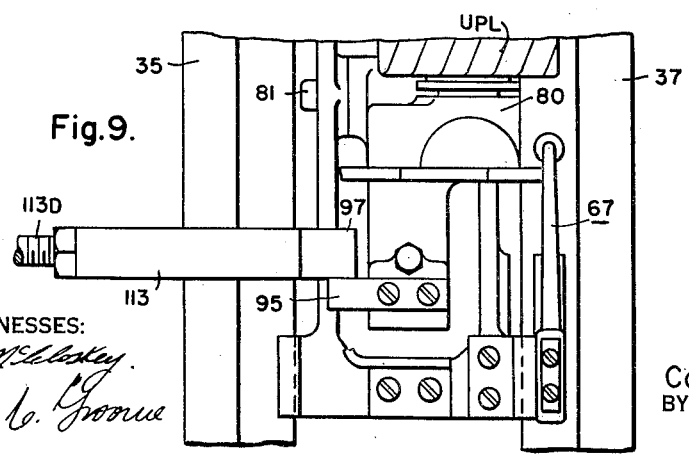
Fig. 9 is a detail view in front elevation with parts broken away, showing the association of a floor clamp with one of the carriage units of Fig. 2.

Referring to Fig. 10, a shaft 155 is mounted for rotation in a suitable housing 157. A worm wheel 159 is mounted on this shaft for rotation relative to the shaft. The sprocket wheel 31 is secured to the shaft 155 for rotation therewith.

Two collars 161 and 163 are splined on the shaft 155. These collars rotate with the shaft but may move axially with respect thereto. Movement of the collar 161 towards the left, as viewed in Fig. 10, is prevented by an abutment (not shown) on the shaft 155. A compression spring 165 is located between the collar 163 and an abutment 167 which is secured to the shaft. The collars 161 and 163 frictionally engage the worm wheel 159 and may be faced with a suitable clutch facing, such as leather or asbestos composition.

The motor AM has on its shaft a worm 169 which engages the worm wheel 159 to establish a driving coupling therebetween. The spring 165 is adjusted to provide adequate friction between the worm wheel 159 and the collars 161 and 163 to force the sprocket wheel 31 to rotate with the worm wheel 159 for all operations which require such rotation. However, if the sprocket wheel 31 has applied thereto an abnormal force preventing rotation thereof, the collars 161 and 163 slip on the worm wheel 159 to permit rotation of the motor AM independently of the sprocket wheel 31.

Turning now to the motor SM and associated apparatus, a tubular sleeve 171 is mounted for rotation in a housing 173. This sleeve has secured thereto a worm wheel 175 located in the housing and a collar 177. The motor SM has on its shaft a worm 179 which engages the worm wheel 175 to rotate the sleeve 171. The sleeve 171 also has a tubular projection on which the sprocket wheel 33 is mounted for independent rotation.

A shaft 181 extends through the sleeve 171 and has a collar 183 secured to one end thereof. The sprocket wheel 33 is located between the collars 177 and 183. The shaft 181 conveniently may be splined to the sleeve 171 to rotate with the sleeve but is movable in an axial direction relative to the sleeve. The shaft 181 is biased to the left, as viewed in Fig. 10, by means of a compression spring 184 which is positioned between an abutment 185 secured to the shaft and an abutment 187 secured to the sleeve.

The shaft 181 is operated by means of an electromagnetic device which includes a cup-shaped housing 189 constructed of soft magnetic material, a tubular core 191 through which the shaft 181 extends and a coil 193 which surrounds the core. At its left-hand end, the shaft 181 has secured thereto an armature disc 195 constructed of soft magnetic material. When the coil 193 is energized, the armature disc 195 is attracted to move the shaft 181 against the bias of the spring 184 to the right in order to release the coupling between the sprocket wheel 33 and the collars 177 and 183. If desired, the collars 177 and 183 may be provided with a clutch facing, such as leather or asbestos composition.

Elevator control system

As previously pointed out, the floor selector described above may be employed with various types of elevator systems. In order to illustrate the application of the floor selector to a suitable elevator system, reference will be made to the circuits shown in Figs. 11 and 12. In these circuits, a number of electromagnetic relays and switches are illustrated. These relays and switches may have contacts of the make type which close when the relay or switch is energized or picked up, and which are opened when the relay is deenergized or dropped out. Alternatively, the relay or switch may have break contacts which open when the relay or switch is energized or picked up and which are closed when the relay or switch is deenergized or dropped out. The relays and switches will be designated by a suitable reference character, and each set of contacts will be designated by an appropriate suffix in the form of a numeral. For example, the expression U1 designates the first set of contacts for the up switch U, whereas the expression U3 designates the third set of contacts for the up switch U.

Figure 11A:
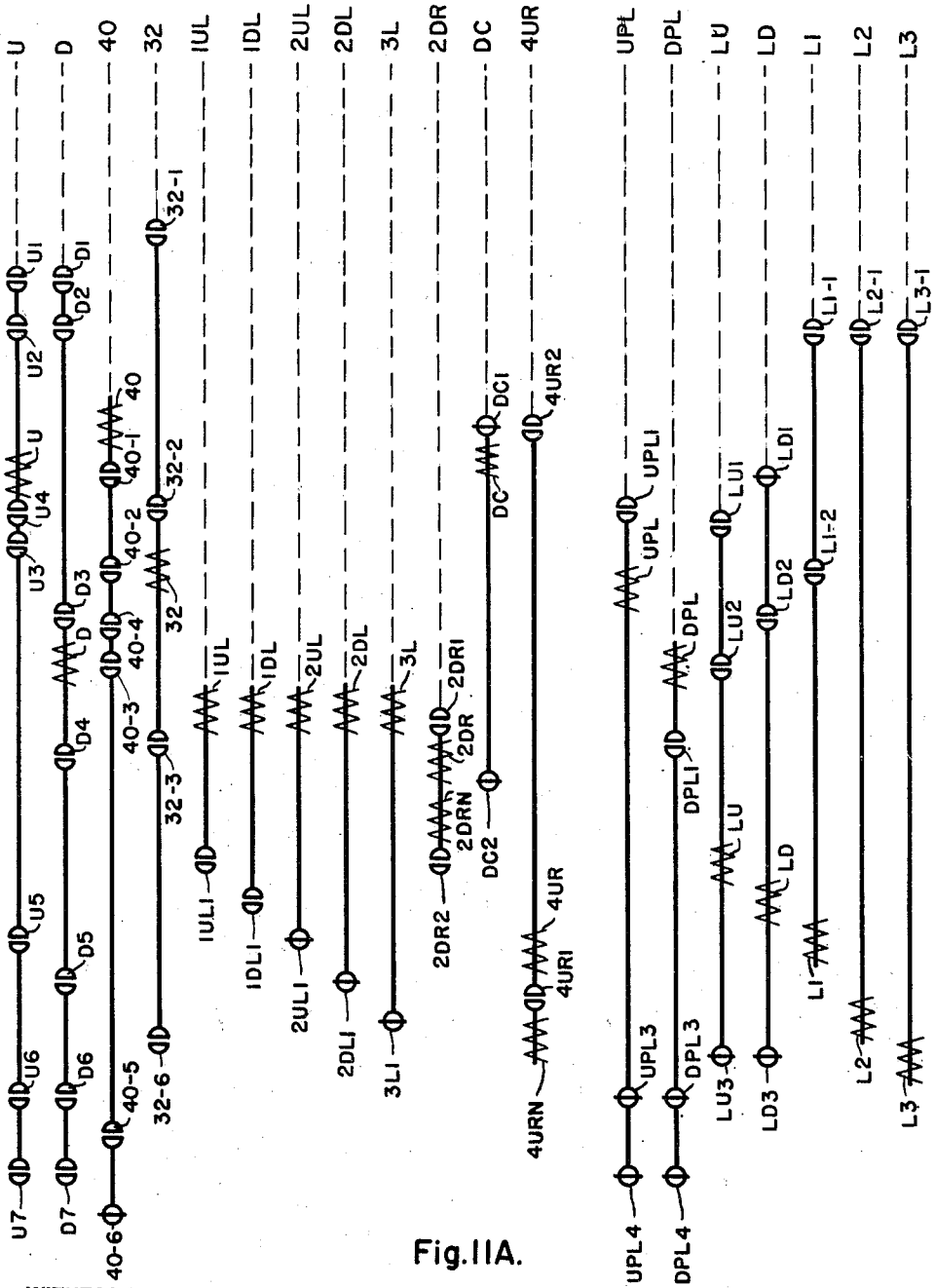
Fig. 11A is a view showing electromagnetic relays and switches employed in the circuits of Fig. 11. This figure has been so constructed that if

In order to facilitate consideration of the control system, a number of the coils, relays and switches referred to are listed below as follows:

40, door relay
U, up switch
D, down switch
32, car-running relay
1UL ⎫
2UL ⎪
1DL ⎬ inductor relays
2DL ⎪
3L ⎭
UPL, up pawl relay
DPL, down pawl relay
DC, door closing relay
2DR etc., down floor call registering relays
2DRN etc., down floor call canceling coils
1UR etc., up floor call registering relays
1URN etc., up floor call canceling coils
LU, up leveling relay
LD, down leveling relay L1, third landing relay
L2, second landing relay
L3, first landing relay Referring to Fig. 11, the elevator motor 1 is of the direct-current type and has a field winding MF connected across direct-current buses B1 and B2 for energization therefrom. The control system illustrated is of the variable-voltage type and includes a generator G having an armature GA connected in a loop with the armature MA of the motor 1. The generator has a field winding which may be connected across the buses B1 and B2 through appropriate contacts of a reversing switch device represented by contacts U1 and U2 which are closed for up travel of the elevator car, and D1 and D2 which are closed for down travel of the elevator car. The generator field GF is energized through a resistor R1 having a number of taps thereon. Portions of the resistor are arranged to be inserted or cut out by operation of switches 5SU, 6SU, 9SU, 10SU, 5SD, 6SD, 9SD and 10SD. These switches are mounted on the floor selector and are operated in accordance with relative movement between the advance and synchronous carriages. They are distinguished by a small circle from the contacts of electromagnetic relays or switches.

In addition, portions of the resistors R1 are controlled by the inductor relays mounted on the elevator car through the contacts L1–1, L2–1 and L3–1.

A door relay 40 is provided which is energized only when the elevator car gate and all of the hoistway doors are closed. Such relays are commonly employed in elevator systems.

The direction of travel of the elevator car is determined by the operation of the up push button UPB or the down push button DPB by the attendant in the elevator car. Operation of one of these buttons energizes a door closing relay DC and under suitable conditions completes an energizing circuit for a car running relay 32 and either an up switch U or a down switch D. The switches U and D determine the direction of travel of the elevator car.

Although the doors may be operated manually, it will be assumed that energization of the door closing relay DC initiates a closing operation of the car gate and the hoistway door for the floor at which the elevator car is stopped. Such door operators are well known in the art.

The inductor relays 1UL, 1DL, 2UL, 2DL and 3L are connected across the buses B1 and B2–a through switches 11SU and 11SD of the floor selector. (Certain extensions of the buses B1 and B2 are labeled B1–a and B2—a.) These switches are operated by relative movement between the advance and synchronous carriages of the floor selector, and both of the switches are closed only if the elevator car is within a predetermined distance of a floor at which it is to stop, such as four feet.

During up travel of the elevator car, a stopping operation of the elevator car is initiated by energization of the up pawl relay UPL. Similarly, during down travel of the elevator car, the stopping operation is initiated by energization of the down pawl relay DPL. These relays are prepared for energization by actuation of a car call push button 1c to 9c. Only five car call push buttons are illustrated in Fig. 11, but it will be understood that a similar call button would be provided for each of the floors served by the elevator car. The car buttons are of the type which when actuated by the car attendant remain actuated until the elevator car reverses its direction of travel. Although the resetting of the relays may be automatically performed, it will be assumed that they are reset manually by the car attendant after the completion of each trip in one direction.

The up and down pawl relays also are prepared for energization by operation of floor push buttons. Thus, for the second floor, a push button 2D may be actuated to energize a floor call registering relay 2DR for the second floor. When energized the call registering relay closes make contacts 2DR1 to establish a holding circuit around the push button 2D. When the call for service is answered, a call canceling coil 2DRN is energized through suitable floor selector contacts to reset the call registering relay 2DR. In accordance with conventional practice, the call canceling coil and the coil of the relay 2DR may be mounted on the same core and may be energized to develop opposing magnetomotive forces in order to reset the relay 2DR when the coil 2DRN is energized. The equipment for the second floor also includes a down lantern 2LAD which is energized through suitable floor selector contacts when the elevator car is to stop at the second floor during a down trip. Although these circuits are shown only for the second floor, it will be understood that a similar set of circuits would be required for each of the floors at which the elevator car may stop during down travel. Ordinarily, such circuits would not be required at the lower terminal floor.

In a somewhat similar manner, each of the floors requiring the stopping of the elevator car during an up trip is provided with a push button and associated circuits. These are shown in Fig. 11 only for the fourth floor. Thus, if a person at the fourth floor desires to travel up, he may operate the push button 4U to energize up call registering relay 4UR. This relay closes its make contact 4UR1 to establish a holding circuit around the push button 4U. In addition, a call canceling coil 4URN is provided which may operate in the manner discussed for the down canceling coil 2DRN. The up lantern 4LAU may be operated from floor selector contacts when the elevator car is to stop at the fourth floor. Contacts of the down call registering relay 2DR and of the up call registering relay 4UR are illustrated for controlling respectively the energizations of the down pawl relay DPL and of the up pawl relay UPL. It will be understood that a similar circuit for energizing each of the pawl relays would be provided for each of the floors requiring the appropriate stopping of the elevator car thereat.

As previously explained, inductor relays are provided for controlling slowdown of the elevator car when it is quite close to the floor at which it is to stop. The inductor relays control at least in part the energization of an up leveling relay LU, a down leveling relay LD, a third landing relay L1, a second landing relay L2 and a first landing relay L3.

The direction of rotation of the advance motor depends on the direction of travel of the elevator car. Consequently, the direction of rotation of the advance motor is determined by a reversing switch device which includes contacts of the up switch U and the down switch D. Under certain conditions, it is desirable to reduce the energization of the advance motor. Such reduction is effected by means of a resistor R2 which has taps controlled by the pawl relays DPL and UPL and by other switches on the floor selector. It will be assumed for present purposes that the advance motor has a field provided by one or more permanent magnets.

The coil 193 for releasing the sprocket wheel 33 (Fig. 10) also is illustrated in Fig. 11.

The connections for the self-synchronous generator SG and the self-synchronous motor SM are illustrated schematically in Fig. 12. The transmitter and receiver each has a single-phase field winding SG1 and SM1, respectively. These windings are connected across a source of alternating current represented by conductors AC1, AC2. The alternating current may have a frequency, such as 60 cycles per second. In addition, the generator SG and the motor SM have polyphase windings SG2 and SM2 which are connected together in a local circuit. As previously pointed out, such position generators and position motors are well known in the art.

Figure 13:
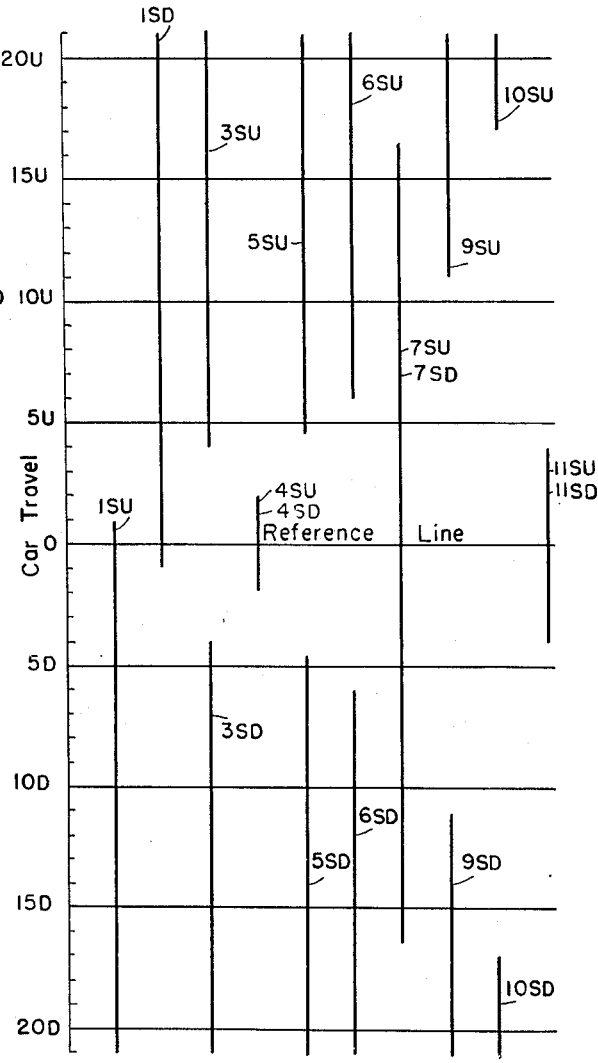
Fig. 13 is a schematic view showing the relationship between the conditions of certain switches employed in the carriage units of Fig. 2 relative to the displacement of synchronous and advance carriages employed in the carriage units.

It will be recalled that a number of switches are operated in accordance with relative movement between the advance and synchronous carriages. Suitable conditions of operation of these switches for the specific system under consideration are illustrated in Fig. 13. However, it should be understood that the lead of the advance carriage relative to the synchronous carriage and the operations of the various switches may be selected in accordance with the requirements of each elevator system. In Fig. 13, ordinates above or below the reference line indicate the lead of the advance carriage relative to the synchronous carriage respectively for up travel and down travel, as the elevator car nears a floor at which it is to stop. By inspection of Fig. 13, it will be noted that the maximum lead in either direction is of the order of 20 feet (expressed in corresponding car travel). Lines are illustrated in Fig. 13 to indicate the period during which switches have their contacts closed. For example, the switch 1SU is positioned to have its contacts closed from a position approximately one foot above the reference line to a position wherein the carriages have their full lead or advance for travel in a downward direction. As a further example, the switches 11SU and the switch 11SD are closed when the elevator car is within approximately 4 feet from a floor at which it is to stop for either direction of travel. It is believed that the positions of the operating conditions for the other switches can be ascertained by reference to Fig. 13.

Operation

A. CAR MOVES FROM FIRST FLOOR TO FOURTH FLOOR

It is believed that an understanding of the invention will be facilitated by a discussion of certain typical operating sequences for the elevator system. For the first sequence it will be assumed that the elevator car is parked at the lower terminal floor and that a passenger desiring to proceed to the fourth floor enters the elevator car.

While the elevator car is parked at the lower terminal floor, the inductor relays 1UL, 1DL, 2UL, 2DL and 3L are energized. Also, the coil 193 is energized. It will be recalled that this coil, when energized, releases the sprocket wheel 33 (Fig. 10) to permit resetting of the synchronous carriages relative to the advance carriages. All other electromagnetic relays and switches in Fig. 11 are deenergized at this time.

When the passenger enters the elevator car, the elevator attendant operates the car push button 4c to register a car call for the fourth floor. It will be recalled that this push button remains in its operated condition until the elevator car has completed an up trip.

Next the elevator car attendant operates the up push button UPB to energize the door closing relay DC. This relay when energized initiates closure of the hoistway door for the lower terminal floor and the car gate in a conventional manner. As a result of such closures, the door relay 40 is energized. This relay closes its make contacts 40–2, 40–3, 40–4 and 40–5 to prepare certain circuits for subsequent energization. In addition, the break contacts 40–6 open to deenergize the coil 193. As a result of the deenergization of the coil 193, the sprocket wheel 33 (Fig. 10) is coupled to the motor SM.

When the door closing relay DC was energized, it opened its break contacts DC1 and DC2. Had either of the relays UPL or DPL been energized at this time, the opening of the contacts DC1 and DC2 would have deenergized them.

The operation of the up push button UPB also completes the following circuit following closure of the contacts 40–1:

B1, UPB, 40–1, LD1, U, 1SD, 32, B2–a

The energization of the up switch U closes the makes contacts U1 and U2 to connect the generator field winding GF for energization in the proper direction for up travel of the elevator car. The make contacts U3 close to prepare a holding circuit for the switch U and the car running relay 32 for subsequent completion. The make contacts U4 close to prepare the up pawl UPL for energization as it approaches a floor for which an up floor call is registered. The make contacts U5 close to prepare the third landing relay L1 for subsequent energization. Finally, the make contacts U6 and U7 close to complete an energizing circuit for the advance motor AM. The direction of energization of the advance motor, as determined by the contacts U6 and U7, is correct for up travel of the elevator car.

At this stage a substantial part of the resistor R2 is shunted and the armature of the advance motor is energized through the circuit:

B1–a, 40–5, 7SU, 7SD, DPL4, UPL4, U6, AM, U7, B2

By reference to Figs. 2 and 3, it will be recalled that the advance motor AM rapidly moves the advance carriage 43A in an upward direction through the distance permitted by the lost-motion coupling between the advance and synchronous carriages.

As explained in the discussion of Fig. 5, the relative motion of the advance and synchronous carriages results in operation of a number of switches, two of which 1SU and 2SU are illustrated in Fig. 5. For the present elevator system, it will be assumed that nine of these switches are employed on each of the carriage units, and these will be identified as switches 1SU, 3SU, 4SU, 5SU, 6SU, 7SU, 9SU, 10SU and 11SU for the up carriage unit, and as switches 1SD, 3SD, 4SD, 5SD, 6SD, 7SD, 9SD, 10SD and 11SD for the down carriage unit. It will be recalled that Fig. 13 illustrates the operation of these switches. Each of the switches in Fig. 13 is represented by a line which indicates the relationship between the closure of the contacts of one of the switches and the displacement of the synchronous carriages relative to the advance carriages. For example, the line for the switch 1SU indicates that the switch is opened when the advance carriage is moved in the up direction by more than a foot from the position which it occupies when the elevator car is parked at a floor (the distances in Fig. 13 indicate the displacement between the advance and synchronous carriages expressed in terms of the corresponding feet of car travel). The reference line corresponds to a position of the advance carriages in register with the synchronous carriages. Such register occurs when the elevator car is parked at a floor. Distances above the reference line represent displacement of the advance carriages relative to the synchronous carriages for elevator car travel in the up direction. Distances below the reference line correspond to displacements of the advance carriage relative to the synchronous carriages during down travel.

As the advance carriages are moved by the advance motor relative to the synchronous carriages, the switch 1SU opens. By reference to Fig. 11, it will be noted that such opening prevents energization of the down switch D. Next, the switch 4SU opens to prevent energization of the coil 193.

As the advance carriages continue to move, the switch 3SU closes to permit energization of the up stop pawl relay UPL by a registered car call. However, for reasons which will be set forth below, such energization cannot take place until the advance carriage nears a floor for which the car call is registered.

Continued movement of the advance carriage results in closing of the switches 5SU, 6SU, 9SU and 10SU in succession to shunt portions of the resistor R1. If desired, the shunt established by each of the switches may be completed through a separate time delay relay in order to have portions of the resistor R1 shunted at timed intervals. However, for present purposes, it will be assumed that the characteristics of the control system are such that suitable acceleration of the elevator car is obtained if the resistor R1 is completely shunted.

During the movement of the advance carriages, the switch 11SU opens to deenergize the inductor relays 1UL, 1DL, 2UL, 2DL and 3L. In addition, the switch 7SU opens as the advance carriages near their fully advance positions to introduce a substantial portion of the resistor R2 in circuit with the armature of the advance motor AM. This reduces heating of the advance motor, but sufficient torque is produced by the advance motor under these conditions to force the advance carriages to follow the synchronous carriage movements.

It will be recalled that the inductor relays were deenergized early in the movement of the advance carriages. As a result of such deenergization, the break contacts 2UL1 close to complete an energizing circuit for the third landing relay L1. This relay closes its make contacts L1–1 to shunt a portion of the resistor R1. In addition, the make contacts L1–2 close to complete a holding circuit for the relay 32 and the up switch U which may be traced as follows:

B1, L1–2, 40–2, U3, U, 1SD, 32, B2–a

Consequently, the car attendant now may release his up push button UPB. Such release deenergizes the door closing relay DC which closes its break contacts DC1 and DC2. The closure of these contacts has no immediate effect on system operation.

The deenergization of the inductor relays also results in closure of the break contacts 2DL1, but this has no immediate effect on the operation of the system.

The deenergization of the inductor relays also resulted in closure of the break contacts 3L1 to complete an energizing circuit for the second landing relay L2. Consequently, the contacts L2–1 close to shunt a further portion of the resistor R1.

Inasmuch as the elevator car was assumed to be accurately positioned at the lower terminal floor, the make contacts 1UL1 and 1DL1 of the inductor relays were open and the break contacts LU3 and LD3 of the leveling relays were closed. Consequently, the closure of the contacts 32–6 of the car running relay resulted in energization of the first landing relay L3 to shunt by its make contacts L3–1 a portion of the resistor R1.

It will be assumed that the advance carriage now is fully advanced and that the adjustment screw 135 (Fig. 6) is in engagement with the advance carriage 43A. From this point on, the advance carriage can advance only with the associated synchronous carriage.

If desired, the elevator system may be so designed that the elevator car starts to move before the advance carriages reach their fully advanced positions. However, in a preferred embodiment of the invention, the advance carriages are moved rapidly and reach their fully-advanced positions before the elevator car starts to move.

It will be recalled that the car running relay 32 was energized at the same time at which the up switch U was energized. As a result of its energization, the car running relay 32 closes its make contacts 32–1 to release the elevator car brake. Such release permits upward travel of the elevator car. The car running relay when energized also closes its make contacts 32–2 and 32–3 to prepare holding circuits for the pawl relays UPL and DPL for subsequent operation. As previously explained, the energization of the car running relay 32 also results in closure of the make contacts 32–6 which control in part the energization of the landing relays L2 and L3.

The elevator car now accelerates to its full running speed in the up direction. As the elevator car moves, the car motion is transmitted through the transmitter or generator SG to the motor SM. This motor thereupon drives the synchronous carriages 43S and 45S (Figs. 2 and 3) in accordance with car movement. Since the advance carriages 43A and 45A now are biased by the advance motor AM in the direction of travel of the synchronous carriages, it follows that all of the carriages now move as a unit.

As the advance carriages move from the position which they occupied while the elevator car was parked at the lower terminal floor, the cams 107, 107X, 109, 109X, 111 and 111X (Fig. 4) successively operate the pile-up switches of the floor stop units. During the initial movement of the advance carriages, certain of the pile-up switches may be operated before the elevator car starts to move. After the advance carriages have reached their fully-advanced positions, they operate their associated pile-up switches of the floor stop units well in advance of the arrival of the elevator car at the corresponding floors. As an example of the operation of the pile-up switches, it may be assumed that one of the switches in each of these sets 53A is employed for operating a conventional car position indicator. Thus, each such switch, when closed, may illuminate a lamp in a starter station which indicates to the starter attendant the position of the associated elevator car. This position indicator may be effective during both up and down travel of the elevator car.

It will be assumed that one of the switches in the set 49A (Fig. 4) is employed for picking up car calls in either direction of travel of the elevator car. Thus, in Fig. 11, the switch 49A(1) is in the floor stop unit for the first floor, the switch 49A(2) is in the floor stop unit for the second floor, etc. However, the closure of one of these switches is effective for a control operation only if the associated car call push button is in operated condition.

As the advance carriage nears the fourth floor, it closes the switch 49A(4) for the fourth floor. This closure may take place when the advance carriage is short of the position which it occupies when the elevator car is at the fourth floor by a distance of the order of 4 feet measured in terms of car travel. If the advance carriage leads the elevator car by a distance equivalent to twenty feet of car travel, it follows that the switch 49A(4) is closed when the elevator car is approximately twenty-four feet from the fourth floor.

Upon the closure of the switch 49A(4), the following circuit is completed:

B1–a, 4c, 49A(4), 40–4, 3SU, UPL, B2

Upon energization, the up pawl relay UPL closes its contacts represented by the switches 67 (Fig. 5). Each one of the switches will be identified by the reference character UPL followed by an appropriate suffix. As shown in Fig. 11, closure of the make contacts UPL1 completes a holding circuit for the up pawl relay through the make contacts 32–2. Opening of the break contacts UPL3 and UPL4 introduces substantial resistance in series with the advance motor AM shortly before the advance carriage is brought to a stop. This reduces heating of the advance motor, as the elevator car is brought to a stop.

The energization of the up pawl relay UPL also projects the cam 105 (Fig. 4) into position for operating the set of switches 49 for the fourth floor. The expression "49(4)" designates the set for the fourth floor. One of these switches 49(4)–1 is closed by the cam to energize the canceling coil 4URN for the fourth floor in the event that the floor call is registered for the fourth floor. However, under the assumed condition, no floor call has been registered.

The cam also closes contacts 49(4)–2 for the purpose of energizing the up lantern 4LAU for the fourth floor.

In addition, the energization of the up pawl relays UPL projects the stop pawl 95 (Fig. 4) into position to engage the lug 97 associated with the clamp 113 of the floor stop unit associated with the fourth floor. Consequently, as the advance carriage continues its upward travel, the pawl 95 engages the lug 97 for the floor stop unit of the fourth floor to bring the advance carriages to a stop.

As the elevator car continues in the upward direction, the synchronous carriage 43S (Fig. 5) moves with respect to the advance carriage 43A to operate the switches 1SU and similar switches mounted on the advance carriage. As previously explained, these switches are operated in accordance with the development illustrated in Fig. 13.

When the elevator car reaches a predetermined position, such as seventeen feet before the fourth floor, the switch 10SU opens to introduce a portion of the resistor R1 in series with the generator field winding GF (at this time the switches 5SD, 6SD, 9SD and 10SD all are open). Consequently, the elevator car decelerates.

When the elevator car reaches a position, such as sixteen feet before the fourth floor, the switch 7SU closes to prepare a shunt circuit for the resistor R2 for subsequent operation.

Upon further movement of the elevator car to a position, such as eleven feet before the fourth floor, the switch 9SU opens to introduce a further portion of the resistor R1 in series with the generator field winding GF and the elevator car again decelerates to a slow speed. When the elevator car reaches a position which may be six feet before the fourth floor, the switch 6SU opens to introduce an additional portion of the resistor R1 in series with the generator field winding GF. This further reduces the speed of the elevator car.

When the elevator car reaches a position approximately four and one-half feet before the fourth floor, the switch 5SU opens to introduce another portion of the resistor R1 in series with the generator field winding. This further decreases the speed of the elevator car. The opening of the switch 5SU completes the deceleration of the elevator car controlled directly by the floor selector. Further reduction in speed of the elevator car is controlled by the inductor relays, and such control will be discussed below.

In response to continued movement of the elevator car at reduced speed, the switch 3SU opens when the elevator car reaches a position approximately four feet from the fourth floor. However, this has no effect on the movement of the elevator car. At the same time, the switch 11SU closes to complete an energizing circuit for the windings of the inductor relays 1UL, 1DL, 2UL, 2DL and 3L.

When the elevator car reaches a predetermined position, such as twenty inches from the fourth floor, the inductor relay 1UL picks up to close its make contacts 1UL1. This results in energization of the up leveling relay LU. Closure of the contacts LU1 has no effect at this time on the movement of the elevator car. Similarly, opening of the break contacts LU2 at this time has no effect on the movement of the elevator car. However, opening of the break contacts LU3 deenergizes the first landing relay L3. Consequently, the make contacts L3–1 open to introduce in series with the generator field winding GF the portion of the resistor R1 which formerly was shunted by the contacts L3–1. Thus at an accurate point in the travel of the elevator car, the speed of the elevator car is reduced by the opening of contacts L3–1.

Continued movement of the elevator car results in the picking up of the inductor relay 2DL. Although this relay opens its break contacts 2DL1, such opening has no effect on the movement of the elevator car at this time.

When the elevator car reaches a predetermined position, such as ten and one-half inches before the fourth floor, the inductor relay 3L reaches the inductor plate for the fourth floor and opens its break contacts 3L1. Such opening of the contacts deenergizes the second landing relay, and this relay opens its make contacts L2–1 to introduce additional resistance in series with the generator field winding GF. Thus, at an accurately determined point, the make contacts L2-1 open to decrease the speed of the elevator car to a still lower value.

The elevator car continues to approach the fourth floor at a low speed until at a distance which may be two and one-half inches from the floor, the inductor relay 2UL reaches the inductor plate for the fourth floor and opens its break contact 2UL1. Such opening deenergizes the third landing relay L1. The third landing relay opens its make contacts L1-1 to introduce an additional portion of the resistor R1 in series with the generator field winding. The entire resistor R1 now is in series with the generator field winding and the speed of the elevator car at an accurate point thus is reduced to its landing value. The make contacts L1-2 also open, but such opening has no effect on the travel of the elevator car for the reason that a circuit for the up switch U and the car running relay 32 now is completed through the break contacts LD1 and the make contacts LU1.

The continued slow motion of the elevator car finally moves the inductor relay 1UL beyond the inductor plate for the fourth floor. As the inductor relay leaves the inductor plate, the contacts 1UL1 reopen to deenergize the up leveling relay LU. This may take place when the elevator car is approximately ⅝ inch from the fourth floor. The deenergization of the relay LU results in opening of the contacts LU1 to deenergize the up switch U and the car running relay 32. The closing of the contacts LU2 has no effect at this time on the operation of the system. Furthermore, the closing of the break contacts LU3 has no effect for the reason that the deenergization of the relay 32 results in opening of the make contacts 32-6.

The car running relay 32 upon deenergization opens its make contacts 32-1 to permit application of the elevator brake by its associated spring. The make contacts 32-2 open but the up pawl relay UPL remains energized through the break contacts DC1 of the door closing relay. Opening of the make contacts 32-3 has no effect at this time on the operation of the system.

The car running relay 32 also opens its make contacts 32-6, but such opening has no effect at this time on the operation of this system.

The deenergization of the up switch U results in opening of the make contacts U1 and U2 to deenergize the generator field winding GF. Opening of the make contacts U3, U4 and U5 has no effect at this time on the elevator car. Opening of the make contacts U6 and U7 deenergizes the advance motor.

The elevator car now is stopped at the fourth floor. The elevator car attendant after arriving at the fourth floor opens his car gate and hoistway door for the fourth floor in order to discharge his passengers. As a result of the openings of the door, the door relay 40 is deenergized. This relay opens its make contacts 40-1, 40-2, 40-3, 40-4 and 40-5, but such openings have no present effect on the operation of the system. The relay also closes its break contacts 40-6 to complete an energizing circuit for the coil 193.

By reference to Fig. 10, it will be recalled that the energization of the coil 193 uncouples the sprocket wheel 33 from the motor SM. Since the sprocket wheel no longer prevents free movement of the synchronous carriages, the rollers 149 and 151 (Fig. 6) can move the synchronous carriages into exact register with the advance carriages in the event that resetting is necessary.

B. CAR MOVES FROM FOURTH FLOOR TO SECOND FLOOR

Next, it will be assumed that the elevator car is positioned at the fourth floor during a down trip. The down pawl relay is assumed to have been energized to bring the car to a stop at the fourth floor. The down lantern is illuminated for the fourth floor. At this time, a person on the second floor operates the push button 2D for the second floor in order to register a floor call. By reference to Fig. 11, it will be noted that operation of the push button 2D energizes the down floor call registering relay 2DR. This relay closes its contact 2DR1 to establish a holding circuit for itself. In addition, the relay closes its make contacts 2DR2 to prepare for subsequent energization of the down pawl relay DPL.

The car attendant now operates the down push button DPB to energize the door closing relay DC. This initiates closure of the hoistway door for the fourth floor and the car gate. The door closing relay also opens its break contacts DC1 and DC2. In opening, the contacts DC2 deenergize the down pawl relay, and this relay thereupon opens contacts 53(4)-2 (corresponding to contacts 53(2)-2 for the second floor) to interrupt the illumination of the down lantern for the fourth floor. The opening of the contacts 53(4)-1 (corresponding to 53(2)-1 for the second floor) has no immediate effect. The down pawl relay DPL also opens contacts DPL1 but this has no immediate effect on the system. Break contacts DPL3 and DPL4 close to permit shunting of substantial parts of the resistor R2.

The closure of the door energizes the door relay 40. This relay closes its make contacts 40-1, 40-2, 40-4, and 40-5, but such closures have no immediate effect on the operation of the system. In addition, the relay opens its break contact 40-6 to deenergize the coil 193. By reference to Fig. 10, it will be recalled that deenergization of the coil 193 couples the sprocket wheel 33 to the motor SM in order to permit the motor to drive the synchronous carriages.

The operation of the down push button DPB by the elevator car attendant also completes the following circuit following closure of the contacts 40-3:

B1, DPB, 40-3, LU2, D, 1SU, 32, B2

The resulting energization of the down switch D closes the contacts D1 and D2 to energize the generator field GF in the proper direction for down travel of the elevator car. Closure of the make contacts D3, D4 and D5 has no immediate effect on the operation of the system. The closure of the make contacts D6 and D7 completes an energizing circuit for the advance motor, the direction of energization being correct for down travel of the elevator car. Since the resistor R2 is shunted, the advance motor rapidly advances the associated advance carriages. As the advance carriages are moved relative to their associated synchronous carriages, the switch 1SD opens to prevent energization of the switch U. The switch 3SD closes to permit energization of the down pawl relay DPL when the elevator car is to answer a registered car call. The switch 4SD opens to prevent energization of the coil 193 during down travel of the elevator car. The switches 5SD, 6SD, 9SD and 10SD close to shunt portions of the resistor R1. The switch 7SD opens to introduce resistance in series with the armature of the advance motor shortly before the advance carriages reach their maximum advance for the down direction. The switch 11SD opens to deenergize the inductor relay windings.

Inasmuch as the inductor relays are deenergized, the leveling relays LU and LD are deenergized. Consequently, the contacts LD1 and LU2 are closed, whereas the contacts LU1 and LD2 are open.

Furthermore, since the inductor relays are deenergized, the third landing relay L1 is energized through the break contact 2DL1 and the make contact D5. This relay consequently has its contacts L1-1 closed to shunt a portion of the resistor R1. The contacts L1-2 are closed to complete with the contacts 40-2 and D3 a holding circuit which permits the car attendant to release the down push button DPB. Such release deenergizes the door closing relay but this has no immediate effect on system operation.

The break contacts 3L1 of the inductor relay 3L and the break contacts LU3 and LD3 of the leveling relays are closed to permit energization of the landing relays L2 and L3.

The car running relay 32 upon being energized closes its contacts 32-1 to release the elevator brake. Make contacts 32-2 and 32-3 close preparing a holding circuit for the down pawl relay DPL for subsequent operation. The contacts 32-6 are closed to complete energizing circuits for the second and first landing relays L2 and L3.

The relays L2 and L3 close their make contacts L2-1 and L3-1 to shunt portions of the resistor R1. The generator field winding GF now is fully energized and the elevator car accelerates rapidly in the down direction. It will be recalled that the advance carriages reach their maximum advance in the down direction prior to the starting of the elevator car.

As the elevator car moves in the down direction, the position generator or transmitter SG energizes the motor SM to drive the synchronous carriages in synchronism with movement of the elevator car. Since the advance carriages are maintained in their advanced positions they move in unison with synchronous carriages during full speed travel of the elevator car in the down direction.

Registered down floor calls are picked up by one of the switches in each of the sets 55A (Fig. 4). As the advance carriage 45 approaches each of the associated floor stop units in succession, it operates successively the sets of switches 55A. When the advance carriage reaches a predetermined point, such as a position which may be four feet (measured in terms of car travel), before the second floor, it closes the switch 55A2-1. This is one of the switches of the set 55A associated with the floor stop unit for the second floor. Since the advance carriage may lead the elevator car by a distance such as twenty feet (measured in terms of car travel), it follows that the switch 55A2-1 is closed when the elevator car is about twenty-four feet from the second floor.

Upon closure of the switch 55A2-1, the down pawl relay is energized through the following circuit:

B1-a, 55A2-1, 2DR2, D4, DPL, B2

The down pawl relay operates its contacts (represented by the set 69 in Fig. 4). The individual switches of the set are identified by the reference character DPL followed by an appropriate suffix. Thus, the make contacts DPL1 close to establish through the make contacts 32-3 a holding circuit for the down pawl relay DPL. In addition, the break contacts DPL3 and DPL4 open to insert additional resistance in series with the advance motor shortly before the advance carriages are brought to a stop.

By reference to Fig. 4, it will be recalled that the down pawl relay upon energization projects its cam 105X into position to engage the set of switches 53 for the second floor. By reference to Fig. 11, it will be observed that the set 53 for the second floor includes a switch 53(2)-1 which is closed to energize the canceling coil 2DRN. Such energization cancels the call registered for the second floor. In addition, a second switch of the set 53(2)-2 closes to energize the down floor lantern 2LAD.

The energization of the down pawl relay DPL also resulted in the projection of the pawl 95X (Fig. 4) into position to engage the lug 97X associated with the clamp 113X for the floor stop unit associated with the second floor. Consequently, the pawl 95X engages the associated lug 97X to bring the advance carriages to a stop when the elevator car is approximately twenty feet from the second floor.

Continued movement of the elevator car results in motion of the synchronous carriages relative to the advance carriages. It will be recalled that such relative motion operates a plurality of switches mounted on the advance carriage 45. Thus, when the elevator car is approximately seventeen feet from the second floor, the switch 10SD opens to introduce a portion of the resistor R1 in series with the generator field winding GF. This results in reduction in speed of the elevator car (the switches 5SU, 6SU, 9SU and 10SU, all are open at this time).

When the elevator car reaches a predetermined position, such as sixteen feet before the second floor, the switch 7SD closes to prepare the shunt circuit around the resistor R2 for subsequent operation.

When the elevator car is approximately eleven feet from the second floor, the switch 9SD opens to introduce a further portion of the resistor R1 in series with the generator field winding, and this further reduces the speed of the elevator car.

When the elevator car is approximately six feet from the second floor, the switch 6SD opens to introduce additional resistance in series with the generator field winding, and the elevator car is decelerated further.

When the elevator car reaches a position approximately four and one-half feet from the second floor, the switch 5SD opens to introduce another portion of the resistor R1 in series with the generator field winding. This still further reduces the speed of the elevator car and completes the deceleration of the elevator car initially directly from the floor selector.

Upon reaching a position four feet from the second floor, the switch 3SD opens, but such opening has no effect at this time on the operation of the elevator car. At the same time, the switch 11SD closes to complete an energizing circuit for the inductor relays 1UL, 1DL, 2UL, 2DL and 3L.

When the inductor relay 1DL reaches the inductor plate for the second floor at a point approximately twenty inches from the second floor, the relay closes its make contacts 1DL1 to energize the down leveling relay LD. This relay opens its break contact LD1 and closes its make contacts LD2, but such contact operations have no immediate effect on the system operation. In addition, the break contacts LD3 open to deenergize the first landing relay L3. This relay opens its make contacts L3-1 to introduce an additional portion of the resistor R1 in series with the generator field winding. The elevator car speed thus is reduced.

When the inductor relay 2UL reaches the inductor plate for the second floor, it opens its break contacts 2UL1, but such opening has no effect at this time on the operation of the system.

At a point, such as ten and one-half inches from the second floor, the inductor relay 3L reaches the inductor plate for the second floor and opens its break contacts 3L1 to deenergize the second landing relay L2. This relay opens its make contacts to introduce a further portion of the resistor R1 in series with the generator field winding to reduce the speed of the elevator car.

When the car is approximately two and one-half inches from the second floor, the inductor relay 2DL reaches the inductor plate for the second floor and opens its break contacts 2DL1 to deenergize the third landing relay L1. The third landing relay opens its make contacts L1-1 to introduce a final portion of the resistor R1 in series with the generator field winding, and this slows the elevator car to its landing speed. In addition, the contacts L1-2 open, but such opening has no effect on the operation of the system at this time for the reason that the down switch D and the car running relay 32 continue to be energized through the contacts LD2 and LU2 of the leveling relays.

As the elevator car reaches a position which may be ⅝ of an inch from the second floor, the inductor relay 1DL leaves the inductor plate and opens its contacts 1DL1 to deenergize the leveling relay LD. This leveling relay closes its break contacts LD1, but such closure has no immediate effect on the operation of the system. The contact LD2, however, opens to deenergize the down switch D and the car running relay 32.

The car running relay 32 upon being deenergized opens its make contacts 32-1 to permit the elevator brake to be applied by means of its spring. Opening of the contacts 32-2 has no effect on the present operation of the system. Opening of the make contacts 32-3 has no immediate effect because down pawl relay DPL continues to be energized through the break contacts DC2 of the door closing relay. The car running relay also opens its make contacts 32-6 to maintain the landing relays L2 and L3 deenergized.

The opening of the down switch contacts D1 and D2 results in deenergization of the generator field winding GF. Opening of the make contacts D3, D4 and D5 has no effect at this time on the system operation. Opening of the contacts D6 and D7 results in deenergization of the advance motor armature. Consequently, the elevator car now comes to rest at the second floor.

During the final movement of the elevator car, the switch 4SD closed (such closure may be when the elevator car is two feet from the second floor). Such closure prepares the coil 193 for subsequent energization. In addition, the switch 1SD closes when the elevator car is within one foot of the second floor to prepare the up switch U for subsequent energization.

The elevator car attendant now opens his car gate and a hoistway door for the second floor to receive the waiting passenger. Such openings result in deenergization of the door relay 40.

Opening of the make contacts 40-1, 40-2, 40-3, 40-4 and 40-5 have no immediate effect on the system operation. However, the closure of the break contacts 40-6 completes an energizing circuit for coil 193. This coil upon being energized releases the sprocket wheel 33 (Fig. 10) and permits registration of the advance and synchronous carriages.

When the passenger has entered the elevator car, the car attendant proceeds to the lower terminal floor by a sequence of operations which will be clear from the preceding discussion.

It should be noted that when the elevator car makes a short run, such as a run from the second to the first floor, the advance carriages may be brought to a stop before they reach their full advance. For example, let it be assumed that the elevator car attendant operates the car push button 1c for the first floor. The advance carriages following operation of the down push button DPB, start to advance in the manner previously described. However, if the first and second floors are separated by less than twenty feet, the advance carriages do not reach their full advance before the switch 49A1 associated with the floor stop unit for the first floor is closed by the cam 109 (Fig. 4). The closure of the switch 49A1 completes an energizing circuit for the down pawl relay DPL, and this relay operates in the manner previously described to bring the advance carriages to a stop. If the first and second floors are spaced by less than seventeen feet it follows that the switch 10SD is not closed during the advance of the advance carriages. Consequently, a portion of the resistor R1 remains in circuit with the generator field winding GF during acceleration, and the elevator car does not accelerate as rapidly for the short run as it does for a longer run. With this exception, it will be appreciated that the system operates for the short run in a manner analogous to the operation of the system for a longer run. Since the inductor relays operate for a very limited travel of the elevator car, it is clear that they are always employed for controlling the elevator car whether the elevator car is operated on a run from one floor to the next floor or on a longer run. Consequently, they are always available for establishing an accurate slowdown pattern for the elevator car as it nears a floor at which the car is to stop.

The system herein illustrated and described also is effective for leveling the elevator car should it have failed to stop accurately at the desired floor. Let it be assumed that the elevator car drops more than ⅝ of an inch from a position in registration with a desired floor. In response to such dropping, the inductor relay 1UL (Fig. 1) reaches the asociated inductor plate and closes its make contacts 1UL1 (Fig. 11) to energize the up leveling relay LU. This relay closes its contacts LU1 to establish the following circuit:

B1, LU1, LD1, U, 1SD, 32, B2-a

Since the up switch U and the car running relay 32 are energized, they operate in a manner previously discussed to initiate movement of the elevator car in an up direction. Such movement of the elevator car continues until the inductor relay 1UL leaves its associated inductor plate. This occurs when the elevator car is within ⅝ of an inch of the desired floor. The inductor relay thereupon opens its contacts 1UL to deenergize the up leveling relay LU. The up leveling relay LU in turn opens its contacts LU1 to deenergize the up switch U in the car running relay 32. Such deenergization results in the stopping of the elevator car in the manner previously described.

When the up leveling relay was energized to return the elevator car to the desired position, the contacts LU2 opened, but such opening had no effect on the operation of the system. The contacts LU3 also opened and prevented energization of the first landing relay L3 when the contacts 32–6 of the car running relay closed. Consequently, the contacts L3–1 of the relay L3 remained open to leave a portion of the resistor associated therewith in series with the generator field winding.

Should the elevator car be displaced upwardly by more than 5/8 of an inch from a position in registration with the desired floor, the inductor relay IDL would be adjacent the associated inductor plate and would close its contacts IDL1 to energize the down leveling relay LD. The down leveling relay then would close its make contacts LD2 to energize the down switch D and the car running relay 32 by the following circuit:

B1, LD2, LU2, D, ISU, 32, B2–a

The up switch D and the car running relay 32 would initiate movement of the elevator car in a down direction in a manner previously described until the inductor relay IDL left the associated inductor plate. Upon such departure of the inductor relay which would occur when the elevator car was approximately 5/8 of an inch from the desired floor, the down switch D and the car running relay 32 would be deenergized, and the car would come to rest in the manner previously described in registration with the desired floor.

The energization of the down leveling relay LD also would result in opening of the break contacts LD1, but such opening would have no effect at this time on the operation of the system. In addition, the contacts LD3 would open to prevent energization of the first landing relay L3. Consequently, the portion of the resistor R1 associated with the contacts L3–1 would remain in series with the generator field winding during the down leveling operation.

Although the invention has been described with reference to certain specific embodiments thereof, numerous modifications falling within the spirit and scope of the invention are possible.

I claim as my invention:

1. In a floor selector for an elevator system, a supporting structure, a drive unit mounted on the supporting structure, a first control device, means mounting the control device for movement through a predetermined path in response to operation of the drive unit, a second control device associated with the first control device, means mounting the second control device for movement with a lost-motion connection in accordance with operation of the drive unit, means for moving the control devices relative to each other through the distance permitted by said lost-motion connection, and electrical switch means carried by only one of said control devices, the control device which has none of the electrical switch means comprising cam means positioned to operate said switch means.

2. A floor selector as claimed in claim 1 wherein the second control device is mounted for movement through a path parallel to and adjacent said predetermined path, said electrical switch means being adjustably mounted on the associated control device.

3. A floor selector as claimed in claim 1 wherein the first-named mounting means comprises an endless flexible loop coupling the first control device to the drive unit.

4. A floor selector as claimed in claim 3 wherein the moving means comprises a motor secured to the supporting structure and an endless flexible loop coupling the second control device to the motor.

5. In a floor selector for an elevator system, a supporting structure, a drive unit, first and second control elements, means mounting the control elements for movement relative to the supporting structure in opposite directions in response to operation of the drive unit, first and second control members associated respectively with the first and second control elements, means for moving each of said control members substantially in accordance with the associated control element, and means for moving the control members relative to the control elements for a predetermined distance, first translating means responsive to the position of the control members relative to the supporting structure, and second translating means responsive to the positions of the control members relative to the control elements.

6. A floor selector as claimed in claim 5 in combination with a separate stop element for each of the control members, stop means secured to the supporting structure, and means for moving each of the stop elements relative to the stop means from a position clear of the stop means to a position wherein the stop element engages the stop means to stop movement of the associated control member relative to the supporting structure.

7. A floor selector as claimed in claim 5 wherein the supporting structure includes a plurality of parallel rails, means cooperating with a first pair of said rails for guiding the first control element and the first control member parallel to said rails, and means cooperating with a second pair of said rails for guiding the second control element and the second control member parallel to said rails.

8. A floor selector as claimed in claim 7 in combination with a stop element for the control members, a plurality of stop members secured to certain of said rails at spaced intervals, and means operable for moving the stop element relative to the stop members from a path clear of the stop members to a position wherein the stop element engages one of the stop members to stop movement of the control members relative to the supporting structure.

9. A floor selector as claimed in claim 7 in combination with a stop element for each of the control members, electroresponsive means on each of said control members operable for moving the associated stop element from a first to a second position, and a plurality of adjustable stop members secured to the supporting structure at spaced points, each of said stop elements being positioned to engage one of said stop members to stop the control member only when the stop element occupies the second of said positions.

10. A floor selector as claimed in claim 7 wherein said first translating means includes parts secured to certain of said pairs of rails.

11. A floor selector as claimed in claim 7 wherein said parallel rails comprise three polygonal rails disposed with a common plane passing substantially through a diagonal of the cross-section of each of the rails, said pairs each including the intermediate one of the rails and a separate one of the outer rails.

12. A floor selector as claimed in claim 11 wherein each unit comprising one of said control elements and the associated control member includes guide notches for receiving adjacent corners of the associated pair of the rails, in order to guide each of the units along the rails.

13. A floor selector as claimed in claim 12 wherein the rails are square in cross-section, and clamp means for securing the first translating means to the outer rails, said clamp means embracing the corners of the outer rails other than the corners received in said notches.

14. In a floor selector for an elevator system, a supporting structure, a first flexible endless loop device mounted on said supporting structure for movement about spaced points located within the loop device, said loop device including first and second control elements mounted for movement in opposite directions between said spaced points, a drive unit for driving said loop device relative to the supporting structure, a second flexible, endless loop device mounted on said supporting structure for movement about spaced points located within the second flexible, endless loop device, said second flexible, endless loop device including first and second control members mounted for movement in paths respectively adjacent the paths of movement of the first and second control elements, a lost-motion connection between said loop devices for driving the loop devices in unison, and drive means for driving said loop devices relative to each other as permitted by said lost-motion connection.

15. A floor selector as claimed in claim 14 wherein the mounting for said loop devices includes a plurality of parallel rails, means cooperating with a first pair of the rails for guiding the first control element, and means cooperating with a second pair of the rails for guiding the second control element.

16. A floor selector as claimed in claim 15 in combination with translating means secured to certain of said pairs of rails, said translating means being responsive to the positions of the control members relative to the supporting structure.

17. A floor selector as claimed in claim 15 wherein certain of said rails have a polygonal cross-section, with a first corner of the rail serving as a guide for one of said control elements and translating means clamped to second, third and fourth corners of one of said rails.

18. In a floor selector for an elevator car, a drive unit, a supporting structure, a first control element, means mounting the control element for movement through a predetermined path in accordance with motion of the drive unit, a second control element, means mounting the second control element for movement through a predetermined path adjacent to said predetermined path, means for moving said second control element in advance of movement of the drive unit as the drive unit is started, and for thereafter moving said second control element in the same direction in accordance with motion of the drive unit until the drive unit is to be stopped, means responsive to initiation of a stopping operation of said drive unit for stopping said second control element, and switch means responsive directly to relative movement of said control elements.

19. A floor selector as claimed in claim 18 in combination with means mounting the switch means for positional adjustment in the direction of travel of the control elements.

20. A floor selector as claimed in claim 18 wherein the switch means comprises a switch mounted on one of the elements and a switch-operating cam mounted on the other of the elements.

21. A floor selector as claimed in claim 18 wherein the switch means comprises a plurality of switches mounted on one of the elements and a cam mounted on the other of said elements for operating the switches, said switches being independently adjustable in the direction of travel of the cam to vary the time of operation of the switches.

22. In a floor selector for an elevator system, a control element, a drive unit, means for driving the control element in a predetermined path in accordance with motion of the drive unit, a control member, lost-motion means for driving the control member in accordance with movement of the drive unit, means for moving the control member relative to the drive unit, and positioning means for adjusting the position of the control element relative to the drive unit at selected intervals.

23. A floor selector as claimed in claim 22 wherein the positioning means includes a releasable coupling for releasing the control element for movement independently of the drive unit, and means for urging the control element towards a predetermined position relative to the control member, whereby upon release of the coupling a predetermined registration of the control element relative to the control member is assured.

24. A floor selector as claimed in claim 22 in combination with means for stopping the control member at predetermined positions in the path of travel thereof, said positioning means being therefore effective for adjusting the position of the control element relative to said predetermined positions.

25. In a floor selector for an elevator system, a control element, a drive unit, means for driving the control element in accordance with motion of the drive unit, said control element being intended to occupy any of a plurality of predetermined spaced positions in its path of travel when at rest, and urging means effective when said control element is adjacent each of said spaced positions and is conditioned to stop for urging said control element relative to the drive unit towards the associated spaced position, said driving means including a releasable coupling permitting the control element to move to one of able when the control element is to stop for persaid spaced positions.

26. A floor selector as claimed in claim 25 wherein the urging means comprises a member having a notch and a roller member biased into said notch, one of said members being mounted on the control element and the other of the members being positioned in accordance with the spaced position at which the control element is to stop.

27. A floor selector as claimed in claim 25 in combination with means for moving the last-named member from the drive unit with a lost-motion connection, yieldable means for urging the last-named member in a predetermined direction to take up the lost motion of said lost-motion connection, and means for stopping the last-named member at any selected one of said spaced positions, said spaced positions corresponding to the floors served by the elevator system.

28. In a floor selector, a floor stop clamp having a plurality of support points, one of said support points being adjustable relative to the other for clamping purposes, a non-circular rod proportioned for reception within said points to orient the clamp in a plane transverse to the rod, said adjustable support point being releasable to permit adjustment of the floor stop clamp along the rod, a switch assembly secured to said clamp, said switch assembly having a cam follower operable for actuating the contacts of the switch assembly, and a cam mounted for movement in a path parallel to the rod for operating the cam follower.

29. A floor selector as claimed in claim 28 wherein the rod has a polygonal cross-section, said stop clamp comprising a C-shaped frame having fingers engaging spaced corners of the rod and a screw member for engaging the rod to force the fingers against said corners.

30. In a floor selector for an elevator assembly, a plurality of parallel, spaced rails, each of said rails having a polygonal cross-section, a carriage unit having notches for receiving a corner of each of said rails for guiding the carriage unit along said rails, a releasable clamp engaging corners of one of said rails displaced from said carriage unit, said clamp when released permitting free movement of said carriage unit along the rails, and translating means secured to the clamp for operation by said carriage unit when the unit is adjacent to said clamp.

31. In a floor selector for an elevator assembly, first, second and third, parallel, square rails each having a diagonal disposed in a common plane, said second rail being intermediate the first and third rails, a first carriage having notches for reception of adjacent first corners of the first and second rails to guide the carriage along the rails, and a second carriage having notches for reception of adjacent corners of the second and third rails to guide the second carriage along the rails, and translating means responsive to the positions of said carriages.

32. A floor selector as claimed in claim 31 wherein said translating means includes a clamp engaging corners of the first rail spaced from the paths of said carriages.

33. A floor selector as claimed in claim 31 wherein said translating means includes a clamp engaging second and third corners of the first rail which are in a plane transverse to said common plane, said clamp having a clamping screw device engaging the fourth corner of said first rail for clamping the clamp to the first rail at any position of adjustment along the rail.

34. A floor selector as claimed in claim 33 in combination with flexible means secured to said carriages to form a loop, and a pair of guide devices spaced apart in the direction of said rails for guiding said flexible means as the carriages move in opposite directions.

35. In a floor selector for an elevator car, a switch member, a cam member, a supporting structure for a first one of the members, means mounting a second one of the members for movement relative to the first one of the members in a rectilinear path in accordance with movement of the elevator car, said switch member being operable by said cam member in response to said movement at a predetermined point in the travel of the movable one of the members, and means for adjusting one of said members in the direction of said rectilinear path relative to the other of said members to change said predetermined point at which the switch member is operated by the cam member, whereby the operation of an elevator car associated with the floor selector may be controlled at a preselected point in the path of travel of the elevator car.

36. In an elevator control system for an elevator car serving a plurality of floors of a structure, a supporting structure, a plurality of first control devices, means mounting the control devices for movement in predetermined paths relative to the supporting structure in accordance with movement of the elevator car, said mounting means and control devices constituting a substantially mechanically balanced system, a plurality of second control devices, one of the second control devices being provided for each of the first control devices, second means mounting the second control devices for movement in predetermined paths relative to the supporting structure in accordance with movement of the elevator car, said second control devices and the second means constituting a substantially mechanically balanced system, said second means being operable for effecting a predetermined movement of the second control devices relative to the elevator car, and translating means responsive to movement of the control devices for controlling the operation of the elevator car.

37. In an elevator control system for an elevator car serving a plurality of floors of a structure, a supporting structure, a plurality of first control devices, means mounting the control devices for movement in predetermined rectilinear paths relative to the supporting structure in accordance with movement of the elevator car, said mounting means and control devices constituting a substantially mechanically balanced system, a plurality of second control devices, one of the second control devices being provided for each of the first control devices, second means mounting the second control devices for movement in predetermined rectilinear paths relative to the supporting structure in accordance with movement of the elevator car, said control devices being disposed in pairs, each of said pairs including one of the first control devices and one of the second control devices arranged to move adjacent each other, said second control devices and the second means constituting a substantially mechanically balanced system, said second means being operable for effecting a predetermined movement of the second control devices relative to the elevator car, and translating means responsive to movement of the control devices for controlling the operation of the elevator car.

38. In an elevator control system for an elevator car serving a plurality of floors of a structure, a supporting structure, a plurality of first control devices, means mounting the control devices for movement in predetermined paths relative to the supporting structure in accordance with movement of the elevator car, said mounting means and control devices constituting a substantially mechanically balanced system, a plurality of second control devices, one of the second control devices being provided for each of the first control devices, second means mounting the second control devices for movement in predetermined paths relative to the supporting structure in accordance with movement of the elevator car, said second control devices and the second means constituting a substantially mechanically balanced system, said second means being operable for effecting a predetermined movement of the second control devices relative to the elevator car, translating means responsive to movement of the control devices for controlling the operation of the elevator car, and means effective substantially while the elevator car is stopped at a predetermined point relative to the structure for correcting any deviation of the first control devices from the positions the first control devices should occupy relative to the elevator car.

39. In an elevator control system for an elevator car serving a plurality of floors of a structure, a supporting structure, a pair of first control devices, means mounting the control devices for movement in parallel linear paths in opposite directions in accordance with movement of the elevator car, said mounting means and control devices constituting a substantially mechanically-balanced system, a pair of second control devices, second means mounting each of the second control devices for movement in a path adjacent and parallel to the path of a separate one of the first control devices, said second mounting means and second control devices constituting a substantially mechanically-balanced system, lost-motion operating means for moving each of the second control devices in unison with the adjacent one of said first control devices, said lost-motion operating means permitting limited movement of the second control devices relative to the first control devices, stopping means operable from an ineffective to an effective condition for stopping the second control devices at predetermined points, first translating means responsive to motion of the first control devices relative to the second control devices for controlling operation of the elevator car, and second translating means responsive to travel of the second control devices relative to the supporting structure for controlling the operation of the stopping means from ineffective to effective condition.

40. In an elevator control system for an elevator car serving a plurality of floors of a structure, a supporting structure, a pair of first control devices, means mounting the control devices for movement in parallel linear paths in opposite directions in accordance with movement of the elevator car, said mounting means and control devices constituting a substantially mechanically-balanced system, a pair of second control devices, second means mounting each of the second control devices for movement in a path adjacent and parallel to the path of a separate one of the first control devices, said second mounting means and second control devices constituting a substantially mechanically-balanced system, lost-motion operating means for moving each of the second control devices in unison with the adjacent one of said first control devices, said lost-motion operating means permitting limited movement of the second control devices relative to the first control devices, stopping means operable from an ineffective to an effective condition for stopping the second control devices at predetermined points, first translating means responsive to motion of the first control devices relative to the second control devices for controlling operation of the elevator car, second translating means responsive to travel of the second control devices relative to the supporting structure for controlling the operation of the stopping means from ineffective to effective condition, said stopping means and second translating means comprising a plurality of floor units for controlling the stopping of the elevator car at each of the floors for which one of the floor units is provided, each of the floor units comprising a securing device for detachably securing the floor unit to the supporting structure, a stopping member carried by the securing device, and switch means carried by the securing device, said second translating means including means cooperating with the switch means of one of the floor units corresponding to a floor at which the elevator car is to stop for placing the stopping means in effective condition, and said stopping means further comprising means cooperating with the stopping member of the last-named floor unit when the stopping means is in effective condition for stopping movement of the second control devices at a point determined by the position of such stopping member on the supporting structure.

41. In an elevator control system for an elevator car serving a plurality of floors of a structure, a supporting structure, a pair of first control devices, means mounting the control devices for movement in parallel linear paths in opposite directions in accordance with movement of the elevator car, said mounting means and control devices constituting a substantially mechanically-balanced system, a pair of second control devices, second means mounting each of the second control devices for movement in a path adjacent and parallel to the path of a separate one of the first control devices, said second mounting means and second control devices constituting a substantially mechanically-balanced system, lost-motion operating means for moving each of the second control devices in unison with the adjacent one of said first control devices, said lost-motion operating means permitting limited movement of the second control devices relative to the first control devices, stopping means operable from an ineffective to an effective condition for stopping the second control devices at predetermined points, first translating means responsive to motion of the first control devices relative to the second control devices for controlling operation of the elevator car, second translating means responsive to travel of the second control devices relative to the supporting structure for controlling the operation of the stopping means from ineffective to effective condition, said stopping means and second translating means comprising a plurality of floor units for controlling the stopping of the elevator car at each of the floors for which one of the floor units is provided, each of the floor units comprising a securing device for detachably securing the floor unit to the supporting structure, a stopping member carried by the securing device, switch means carried by the securing device, said second translating means including means cooperating with the switch means of one of the floor units corresponding to a floor at which the elevator car is to stop for placing the stopping means in effective condition, and said stopping means further comprising means cooperating with the stopping member of the last-named floor unit when the stopping means is in effective condition for stopping movement of the second control devices at a point determined by the position of such stopping member on the supporting structure, means responsive to continued motion of the first control devices relative to the second control devices through said limited movement for controlling slowdown of the elevator car, and means effective following said last-named limited movement for correcting any deviation of the first control devices and the second control devices from predetermined positions relative to each other.

42. In an elevator system having a hoistway, an elevator car mounted in the hoistway for movement therein and means including position-responsive mechanism mounted in the hoistway and on the elevator car for detecting the arrival of the elevator car at a predetermined position, in combination with control means for controlling the movement of the elevator car in the hoistway, said control means comprising a control device, means for moving the control device in accordance with movement of the elevator car, and means dependent on operation of the position-responsive mechanism for stopping the elevator car at a predetermined point and for correcting any deviation of the control device from a position corresponding to said predetermined point.

43. In an elevator system having a hoistway, an elevator car mounted in the hoistway for movement therein and means including position-responsive mechanism mounted in the hoistway and on the elevator car for detecting the arrival of the elevator car at any of a plurality of predetermined spaced positions, in combination with control means for controlling the movement of the elevator car in the hoistway, said control means comprising a control device, means for moving the control device in accordance with movement of the elevator car, and means dependent on operation of the position-responsive mechanism upon arrival of the elevator car at any of the predetermined positions for stopping the elevator car at a predetermined distance from the operated position-responsive mechanism and for correcting any deviation of the control device from a position corresponding to said stopped elevator car.

44. An elevator system having an elevator car serving a plurality of floors of a structure, and having call means for registering calls for elevator service, in combination with a floor selector comprising a supporting member, a plurality of spaced floor units adjustably mounted on the supporting member, whereby the floor units may be spaced in accordance with the spacing of the floors of a structure with which the floor selector is associated, each of said floor units comprising a first stopping device and an electrical switch device, a traveler, means mounting the traveler for movement relative to the supporting member in a path adjacent the floor units, said traveler comprising means for successively operating the electrical switch device of each of the floor units as the traveler moves relative to the floor units, said traveler further comprising a second stopping device operating when in effective condition for coacting with the nearest one of the first stopping devices in the direction of movement of the traveler for stopping movement of the traveler, means responsive to operation of each of the switch devices for placing the second stopping device under control of the call means which, if a call is registered for a floor being approached by the elevator car, places the second stopping device in said effective condition, and translating means responsive to stopping of the traveler.

45. An elevator system having an elevator car serving a plurality of floors of a structure, and having call means for registering calls for elevator service, in combination with a floor selector comprising an elongated supporting member, a plurality of spaced floor units adjustably mounted on the supporting member along the length of the supporting member, said floor units and supporting member having coacting configurations preventing relative movement therebetween except along the length of the supporting member, clamping means for clamping each of the floor units in adjusted position on the supporting member, whereby the floor units may be spaced in accordance with the spacing of the floors of a structure with which the floor selector is associated, each of said floor units comprising a first stopping device and an electrical switch device, a traveler, means mounting the traveler for movement relative to the supporting member in a path adjacent the floor units, said traveler comprising means for successively operating the electrical switch device of each of the floor units as the traveler moves relative to the floor units, said traveler further comprising a second stopping device operating when in effective condition for coacting with the nearest one of the first stopping devices in the direction of movement of the traveler for stopping movement of the traveler, means responsive to operation of each of the switch devices for placing the second stopping device under control of the call means which, if a call is registered for a floor being approached by the elevator car, places the second stopping device in said effective condition, and translating means responsive to stopping of the traveler.

46. In a floor selector for controlling operation of an elevator car, a supporting structure, a carriage body, means mounting the carriage body for movement relative to the supporting structure in a predetermined path, a cam body, means mounting the cam body for movement relative to the carriage body in the direction of said path, switch means mounted on the carriage body for operation by said movement of the cam body, means for moving said bodies in unison along the path with one of the bodies leading the other of the bodies, and means for stopping the leading body at any of a plurality of spaced predetermined points in its movement, the trailing one of the bodies thereafter operating the switch means in response to continuation of the motion of the trailing one of the bodies.

47. An elevator system having an elevator car for serving a plurality of floors of a building structure, motive means for moving the elevator car, and regulator means for regulating the motive means, in combination with a floor selector for controlling said regulator means, said floor selector comprising a supporting structure, a carriage body, means mounting the carriage body for movement relative to the supporting structure in a predetermined path, a cam body, means mounting the cam body for movement relative to the carriage body in the direction of said path, switch means mounted on the carriage body for operation by said movement of the cam body, means for moving said bodies in unison with the elevator car along the path with one of the bodies leading the other of the bodies, means for stopping the leading body at any of a plurality of spaced predetermined points in its movement corresponding to floors at which the elevator car may be conditioned to stop, the trailing one of the bodies thereafter operating the switch means in response to continuation of the motion of the trailing one of the bodies, and means responsive to said last-mentioned operation of the switch means for operating the regulator to decelerate the elevator car in order to stop the elevator car at a desired one of the floors.

48. An elevator system for a structure having a plurality of floors and a hoistway, said elevator system having an elevator car disposed in the hoistway, means mounting the elevator car for movement to serve the floors, brake means for stopping the elevator car, call means for registering calls from the floors for elevator service, and motive means for moving the elevator car, detecting means including detectors in the hoistway for detecting when in effective condition the approach of the elevator car to each of the floors, in combination with control means for controlling movement of said elevator car, said control means comprising a first carriage movable in accordance with movement of the elevator car relative to the structure, a second carriage movable in accordance with the first carriage, said second carriage being operable to lead said first carriage, means responsive to registration of a call for service from one of the floors for stopping the second carriage as the elevator car approaches the floor for which the call is registered, means responsive to continued motion of the first carriage for slowing the elevator car as it approaches the floor for which the call is registered, and means responsive to operation of the detecting means as the elevator car approaches the floor for which the call is registered for stopping the elevator car at such floor.

49. An elevator system for a structure having a plurality of floors and a hoistway, said elevator system having an elevator car disposed in the hoistway, means mounting the elevator car for movement to serve the floors, brake means for stopping the elevator car, call means for registering calls from the floors for elevator service, and motive means for moving the elevator car, detecting means including detectors in the hoistway for detecting when in effective condition the approach of the elevator car to each of the floors, in combination with control means for controlling movement of said elevator car, said control means comprising a first carriage movable in accordance with movement of the elevator car relative to the structure, a second carriage movable in accordance with the first carriage, said second carriage being operable to lead said first carriage, means for starting the elevator car from a floor and establishing said lead, means responsive to registration of a call for service from one of the floors for stopping the second carriage as the elevator car approaches the floor for which the call is registered, means responsive to continued motion of the first carriage for slowing the elevator car as it approaches the floor for which the call is registered, means responsive to operation of the detecting means as the elevator car reaches a predetermined distance in advance of the floor at which it is to stop for further slowing the elevator car, and means responsive to operation of the detecting means as the elevator car reaches braking distance from the floor at which it is to stop for operating the brake means to stop the elevator car at such floor.

50. In a floor selector for an elevator car serving a plurality of floors of a building structure, a carriage, a supporting structure having guide rail means engaging the carriage to guide the carriage along a predetermined path, a plurality of floor units spaced in the direction of said path, said guide rail means comprising a common rail for guiding the carriage and for supporting the floor units, each of the floor units having releasable clamping means for securing the floor unit adjustably to the common rail, whereby each of the floor units may be adjusted along the common rail, and translating means having a first component on each of the floor units and having a second component on the carriage, said translating means being responsive under predetermined conditions to a predetermined position of the carriage relative to each of the floor units.

51. In a floor selector for an elevator car serving a plurality of floors of a building structure, a carriage, a supporting structure having guide rail means engaging the carriage to guide the carriage along a predetermined path, a plurality of floor units spaced in the direction of said path, said guide rail means comprising a common rail for guiding the carriage and for supporting the floor units, each of the floor units having releasable clamping means for securing the floor unit adjustably to the common rail, whereby each of the floor units may be adjusted along the common rail, translating means having a first component on each of the floor units and having a second component on the carriage, said translating means including a switch device and a first stopping device disposed on each of the floor units, said translating means including means carried by the carriage for operating the switch device of each of the floor units, and said translating means including a second stopping device operable between a position engaging, and a position clear of, the stopping element of any of the floor units being approached by the carriage.

52. In a floor selector, an elongated supporting member, a plurality of floor units distributed along the supporting member, said supporting member having a uniform non-circular cross-section; each of said floor units comprising a releasable clamp engaging said supporting member, said clamp having a configuration forcing the clamp into a predetermined orientation in a direction transverse to the supporting member, said clamp when released permitting adjustment of the floor unit in a direction parallel to the supporting member, and switch means; a control element, means mounting the control element for movement parallel to the supporting member for operating the switch means of the floor units.

53. In a floor selector, an elongated supporting member, a plurality of floor units distributed along the supporting member, said supporting member having a uniform non-circular cross-section, said cross-section having a major dimension and a minor dimension; each of said floor units comprising a releasable clamp engaging said supporting member, said clamp having a generally C-shaped configuration forcing the clamp into a predetermined orientation in a direction transverse to the supporting member, said C-shaped configuration providing an opening greater than said minor dimension but less than said major dimension for permitting reception of the supporting member within the clamp by relative movement thereof transverse to the supporting member, said clamp after said reception being movable about the supporting member to a mounting position presenting said major dimension to said opening and said clamp including releasable clamping means cooperating with the C-shaped configuration for securing the clamp to the supporting member in said mounting position, said clamp when released permitting adjustment of the floor unit in a direction parallel to the supporting member, and switch means; a control element, means mounting the control element for movement parallel to the supporting member for operating the switch means of the floor units.

CONWELL SAVAGE.

No references cited.